US012435033B2

(12) United States Patent
Chen et al.

(10) Patent No.: US 12,435,033 B2
(45) Date of Patent: Oct. 7, 2025

(54) METHOD AND DEVICE FOR PREPARING ADIPONITRILE

(71) Applicants: ZHEJIANG NHU COMPANY LTD., Zhejiang (CN); ZHEJIANG NHU SPECIAL MATERIALS CO., LTD., Zhejiang (CN)

(72) Inventors: Zhirong Chen, Zhejiang (CN); Wenbin Wu, Zhejiang (CN); Guiyang Zhou, Zhejiang (CN); Ming Feng, Zhejiang (CN); Xingxing Shi, Zhejiang (CN); Tao Ma, Zhejiang (CN); Zhichao Feng, Zhejiang (CN); Xiongwei Zhang, Zhejiang (CN); Qing Sun, Zhejiang (CN); Yong Xu, Zhejiang (CN)

(73) Assignees: ZHEJIANG NHU COMPANY LTD, Zheijiang (CN); ZHEJIANG NHU SPECIAL MATERIALS CO., LTD., Zheijiang (CN)

( * ) Notice: Subject to any disclaimer, the term of this patent is extended or adjusted under 35 U.S.C. 154(b) by 702 days.

(21) Appl. No.: 17/778,276

(22) PCT Filed: Dec. 11, 2020

(86) PCT No.: PCT/CN2020/135799
§ 371 (c)(1),
(2) Date: May 19, 2022

(87) PCT Pub. No.: WO2021/143412
PCT Pub. Date: Jul. 22, 2021

(65) Prior Publication Data
US 2023/0035875 A1 Feb. 2, 2023

(30) Foreign Application Priority Data
Jan. 19, 2020 (CN) .......................... 202010062278.7

(51) Int. Cl.
*C07C 253/10* (2006.01)
(52) U.S. Cl.
CPC ........ *C07C 253/10* (2013.01); *C07C 2531/24* (2013.01)
(58) Field of Classification Search
CPC .............................. C07C 253/10; B01J 31/185
See application file for complete search history.

(56) References Cited

U.S. PATENT DOCUMENTS

| 3,153,084 A | 10/1964 | Veazey et al. |
| 3,642,592 A | 2/1972 | Beck et al. |
| 3,865,865 A | 2/1975 | Musser et al. |
| 4,155,818 A | 5/1979 | Campbell et al. |
| 4,207,151 A | 6/1980 | Franke et al. |
| 4,306,949 A | 12/1981 | Campbell et al. |
| 5,332,580 A | 7/1994 | Young |
| 9,040,733 B2 * | 5/2015 | Moerbe ................. C07C 253/10 558/308 |
| 9,296,768 B2 | 3/2016 | Tenn, III |
| 2013/0035387 A1 | 2/2013 | Dalton et al. |

FOREIGN PATENT DOCUMENTS

| CN | 1787990 A | 6/2006 |
| CN | 1914160 A | 2/2007 |
| CN | 1914162 A | 2/2007 |
| CN | 103080074 A | 5/2013 |
| CN | 103189351 A | 7/2013 |
| CN | 104011014 A | 8/2014 |
| CN | 106140234 A | 11/2016 |
| CN | 108137487 A | 6/2018 |
| CN | 109055970 A | 12/2018 |
| CN | 109912452 A | 6/2019 |
| CN | 113264847 A | 8/2021 |
| EP | 2574189 B1 | 1/2014 |
| JP | 49102618 | 9/1974 |
| JP | 2013535421 A | 9/2013 |
| WO | 2012005915 A1 | 1/2012 |

(Continued)

OTHER PUBLICATIONS

Xiaoli, et al., Spectroscopy Process Analytical Techniques Used for On-Line Determination of Petrochemicals; Modern Scientific Instruments, No. 3, 2006, 12.31, Section 1,2,3.
Hua, et al.;The Development of Process Analytical Chemistry, Reviews and Progress in Analytical Chemistry, vol. 29, No. 4, 2001, 4.30.
The International Search Report issued in corresponding International PCT Application No. PCT/CN2020/135799; Mailing date: Mar. 18, 2021.
Balakhnina, et al.; Raman Spectral Determination of Chemical Reaction Rate Characteristics, Journal of Applied Spectroscopy, Sep. 2017, vol. 84, No. 4.

(Continued)

*Primary Examiner* — Sikarl A Witherspoon
(74) *Attorney, Agent, or Firm* — Chrisman Gallo Tochtrop LLC

(57) ABSTRACT

Provided are a method and device for preparing adiponitrile. The method of the present disclosure comprises the steps of a first hydrocyanation reaction, an isomerization reaction and a second hydrocyanation reaction, wherein online Raman spectroscopy is used for detecting the content of a specific component in the system; and the reaction conditions are regulated based on the detection results, so as to achieve precise control of the materials in each step of the reaction system. The method of the present disclosure can reduce an amount of butadiene, thereby reducing the subsequent energy consumption needed for recycling butadiene and equipment investment after reaction; by monitoring the content of hydrocyanic acid in real time, the residue of hydrocyanic acid is reduced to a lower level, and the operation safety and the stability of a catalyst during reaction are improved; and the loss of the catalyst is reduced.

19 Claims, 16 Drawing Sheets

(56) References Cited

FOREIGN PATENT DOCUMENTS

| | | |
|---|---|---|
| WO | 2012005917 A1 | 1/2012 |
| WO | 2014099610 A1 | 6/2014 |
| WO | 2017221987 A1 | 5/2019 |

OTHER PUBLICATIONS

Pezolet, et al.; Raman spectra of liquid and crystalline HCN and DCN, Canadian Journal of Chemistry, 1969, No. 47,3041-3048.
Pezolet, et al.; Raman spectra of liquid and crystalline HCN and DCN; Canadian Journal of Chemistry, vol. 47, 1969, pp. 3041-3048.
An Office Action issued in corresponding Japanese Application No. 2022-541908; Dated: Aug. 1, 2023.

* cited by examiner

METHOD AND DEVICE FOR PREPARING ADIPONITRILE

TECHNICAL FIELD

The present disclosure relates to a method for preparing and separating chemical products, and specifically to a method for preparing and separating adiponitrile and a device for preparing adiponitrile.

BACKGROUND

Adiponitrile (ADN) is a colorless and transparent oily liquid, which is slightly bitter and flammable, and the molecular formula is $NC(CH_2)_4CN$. Adiponitrile is an important organic chemical intermediate, which is mainly used in hydrogenation to produce hexamethylenediamine in industry, and then polymerized by hexamethylenediamine and adipic acid to produce polyadipamide (nylon 66).

Currently, the method for preparing adiponitrile from butadiene is the most advanced method for producing adiponitrile in the world. The method is developed on the basis of the chlorination and cyanation process of butadiene by Du Pont, USA. This method overcomes the problems that the chlorination and cyanation process of butadiene requires large-scale matching chlor-alkali engineering, serious corrosion of equipment and the like; and compared with other methods for preparing adiponitrile, the method has the advantages of raw materials that are readily available, low cost, low energy consumption, high product yield and the like.

The hydrocyanation process of butadiene is obtained by subjecting butadiene to a first hydrocyanation, an isomerization, and a second hydrocyanation reaction. In the fast hydrocyanation reaction, butadiene is reacted with hydrocyanic acid by addition reaction under the presence of a transition metal catalyst to obtain a product mainly including 3-pentenenitrile and 2-methyl-3-butenenitrile, and complexes of phosphine or phosphite ligands of transition metals are generally adopted as catalysts. Generally, the molar charge ratio of butadiene to hydrocyanic acid is above 1:0.9 for completing the reaction of hydrocyanic acid. After completing the reaction, the excessive butadiene needs to be recovered and reused after complex separation treatment, which also brings problems of high energy consumption, complex separation equipment and high investment. The molar ratio of butadiene to hydrocyanic acid used in U.S. Pat. No. 3,153,084 is 1.00: 0.90 to 1.04 to reduce the amount of recovered butadiene, and the concentration of 2-methyl-3-butenenitrile is controlled to be lower than 15% of the total mass of the reaction liquid by optimizing the residence time of the reaction. Although the amount of the recovered butadiene is reduced by this method, it is also accompanied by a large amount of residual hydrocyanic acid, and the residual hydrocyanic acid may poison the transition metal catalyst, and the formed metal cyanide waste salt not only increases the consumption of the catalyst, but also has great potential safety hazard.

In the isomerization reaction, 2-methyl-3-butenenitrile is isomerized under catalytic conditions to give 3-pentenenitrile, which can generally be carried out under the same catalyst and Lewis acid promoter as in the first hydrocyanation, as described in U.S. Pat. Nos. 4,080,374, 4,705,881 and the like. Although the added Lewis acid increases the reaction efficiency, the production cost and the difficulty of post-treatment are increased simultaneously. In the patent U.S. Pat. No. 9,932,298, 2-pentenenitrile is used as a reaction solvent to avoid the use of Lewis acid, but 2-pentenenitrile will reduce the activity of the catalyst, and also increase the difficulty of the post-treatment (separation of 2-pentenenitrile and 3-pentenenitrile) at the same time, and increase the energy consumption.

In the second hydrocyanation reaction, 3-pentenenitrile is reacted with hydrocyanic acid under the catalytic conditions to obtain adiponitrile, and complexes of zero-valent nickel with phosphine or phosphite ligands as catalysts and Lewis acid promoter are generally adopted. Although 3-pentenenitrile is usually used in excess with respect to the amount of hydrocyanic acid, 10 to 5000 ppm of hydrocyanic acid remains after completing the reaction. The residual hydrocyanic acid may enter the recycle materials of 3-pentenenitrile and continuously accumulate therein. When the content of hydrocyanic acid is reached to a certain extent, hydrocyanic acid will react with the transition metal catalyst to produce inactivated metal cyanide waste salt, which will cause irreversible consumption of catalysts; on the other hand, the residual hydrocyanic acid may undergo a highly exothermic polymerization reaction, which not only has potential safety hazards, but also the solid polymer blocks the reaction device and affects the continuous operation of the production device. At the same time, in the second hydrocyanation reaction, 3-pentenenitrile or 4-pentenenitrile is isomerized under the action of the Lewis acid promoter to produce 2-pentenenitrile, and 2-pentenenitrile may reduce the activity of the catalyst. Moreover, the hydrolysis of the complex catalyst or ligand may also result in loss of the catalyst. However, the destruction of the catalyst by hydrocyanic acid or the hydrolysis of the catalyst itself generally occurs during the hydrocyanation reaction, and a decrease in the catalyst content can adversely affect the selectivity and yield of the reaction.

U.S. Pat. No. 7,659,422 provides a hydrocyanation process for preparing adiponitrile and other C6 dinitriles. This technique strictly controls the feeding amount of pentene nitrite and hydrocyanic acid in the second hydrocyanation reaction, the reaction yield is improved. Yet, only the amount of 2-pentenenitrile is controlled by the said invention, and the problems that the poisoning of catalysts or hydrolysis of ligands caused by hydrocyanic acid is not involved therein.

U.S. Pat. No. 9,296,768 provides a method for stabilizing a hydrocyanation catalyst, specifically to a method for converting an acidic ligand hydrolysis product, diaryl phosphite, to a neutral phosphoric acid diester product in a two-step hydrocyanation reaction. The invention only inhibits the hydrolysis of the catalyst, and only controls the feeding and discharging materials, and cannot precisely control the hydrocyanation reaction process.

The prior art discloses many methods for stabilizing the catalyst and improving the reaction efficiency prior art, but lacks a precise control method for the reaction process and the post-treatment process. Patent DE102004004672 A1 provides a method for preparing 3-pentenenitrile by the hydrocyanation reaction of butadiene, and specifically to a method for measuring the residual amount of hydrocyanic acid in a recycle stream of butadiene by capacitive measurement, near-infrared transmission spectroscopy, mid-infrared transmission spectroscopy. ART mid-infrared transmission spectrometry, liquid-phase hot melt measurement and the like. The invention only monitors the hydrocyanic acid in the reaction effluent material and cannot monitor the stock of the active catalyst, the residual hydrocyanic acid and the content of the byproduct 2-methyl-3-butenenitrile in the hydrocyanation reaction system.

In conclusion, it is extremely necessary to provide a precise control method for each material in the reaction system in the adiponitrile preparation process, and to realize the systematic control of the ratio of reaction materials, the content of active catalyst in the system, the residual amount of hydrocyanic acid and the content monitoring method of each component in the post-treatment process.

SUMMARY

Problem to be Solved

The present disclosure provides a method for preparing adiponitrile, wherein the content of a specific component in a system is detected, and the reaction conditions are regulated based on the detection result, thereby realizing precise control of materials in each step in the reaction system.

Solution for Solving the Problem

The first aspect of the present disclosure provides a method for preparing adiponitrile, comprising:
step 1: subjecting hydrocyanic acid and butadiene to a first hydrocyanation reaction in the presence of a first catalyst to form a first stream comprising 3-pentenenitrile (3PN), 2-methyl-3-butenenitrile (2M3BN), the first catalyst, and butadiene, detecting the concentration of the hydrocyanic acid in the system, and enabling a residual amount of the hydrocyanic acid in the final first stream to be less than 10 ppm and a molar ratio of a total amount of the hydrocyanic acid to the amount of butadiene in the first hydrocyanation reaction to be 0.75 to 1.0 by regulating a ratio of raw materials, a reaction temperature, a reaction residence time, or a combination of the above modes:
step 2: subjecting the first stream obtained in step 1 to an isomerization reaction to obtain a second stream comprising a mononitrile containing 2-pentenenitrile (2PN), 3-pentenenitrile (3PN), and 4-pentenenitrile (4PN), an unreacted 2-methyl-3-butenenitrile (2M3BN), the first catalyst, and butadiene, detecting the amounts of 3-pentenenitrile (3PN) and 2-methyl-3-butenenitrile (2M3BN) in the reaction system, and enabling the ratio of 3-pentenenitzile (3PN) in the second stream to the mononitrile containing 2-pentenenitrile (2PN), 3-pentenenitrile (3PN), and 4-pentenenitrile (4PN) to be 0.8 or more by regulating the amount of the first catalyst, the reaction temperature, the reaction residence time, or the combination of the above modes: then, obtaining a stream containing 3-pentenenitrile (3PN) by a post-treatment step;
step 3: subjecting the hydrocyanic acid, the stream containing 3-pentenenitrile (3PN) obtained in step 2, a second catalyst and a promoter to a second hydrocyanation reaction to obtain a third stream containing the 3-pentenenitrile (3PN), the second catalyst, the promoter, and a dinitrile component containing adiponitrile (ADN), 2-methylglutaronitrile (MGN), and 2-ethylsuccinonitrile (ESN), detecting the amounts of the second catalyst, the hydrocyanic acid residue and/or 3-pentenenitrile (3PN) residue in the system, and enabling a conversion rate of 3-pentenenitrile (3PN) to be 600 or more and the molar ratio of the total amount of the hydrocyanic acid to 3-pentenenitrile (3PN) in the second hydrocyanation reaction to be 0.60 to 1.0 by regulating the ratio of raw materials, the reaction temperature, the reaction residence time, or the combination of the above modes; and, obtaining an adiponitrile product by the post-treatment step:
An online Raman spectroscopy detection is adopted for the above detection;

the first catalyst and the second catalyst are each independently selected from zero-talent nickel complexes containing phosphorus ligands and/or free phosphorus ligands, and
the promoter is a Lewis acid.

In an embodiment of the present disclosure, wherein the first hydrocyanation reaction is carried out in a first reactor, and the first reactor is selected from a circulating reactor, multistage series circulating reactor, a stirred tank reactor, a multistage series agitation reactor, a tubular reactor with premixing, a multistage series tubular reactor, a combination of the circulating reactor and the tubular reactor, a combination of the multistage series circulating reactor and the tubular reactor, and a combination of the agitation reactor and the tubular rector, or a combination of the multistage series agitation reactor and the tubular reactor, and the multistage series reactor is 2 to 10 stages connected in series, and the residence time of each stage of the reactor in the first hydrocyanation reaction is 0.01 to 5.0 hours.

In an embodiment of the present disclosure, wherein when the step 1 is carried out in the multistage series reactor, the concentration of hydrocyanic acid in the stream of each stage of the reactor is detected, wherein the stream of the last stage is the first stream.

In an embodiment of the present disclosure, wherein a temperature of the first hydrocyanation reaction in the step 1 is 60 to 140° C., and a reaction pressure is 0.5 to 5.0 MPa; the feeding molar ratio of the zero-valent nickel to butadiene is 0.001 to 0.10:1; and the molar ratio of the total amount of phosphorus ligands and free phosphorus ligands to the zero-v alert nickel in the first catalyst is 5 to 50:1.

In an embodiment of the present disclosure, wherein the post-treatment step in step 2 is distillation, and the stream containing 3-pentenenitrile (3PN) is obtained by distillation, wherein the residual amounts of the other components comprising butadiene and 2-methyl-3-butenenitrile (2M3BN) other than 3-pentenenitrile (3PN) is detected, and at least one of temperature, pressure, residence time, and reflux ratio of the distillation is controlled based on the detection result, to achieve an optimal separation effect (for example, content of 3PN≥98%, and the content of 2M3BNN≤0.5%).

In an embodiment of the present disclosure, wherein the distillation is a three-stage distillation, and the stream containing butadiene, 3-pentenenitrile (3PN), and 2-methyl-3-butenenitrile (2M3BN) is separated from the stream containing the first catalyst by the first state distillation; the stream containing butadiene, 3-pentenenitrile (3PN), and 2-methyl-3-butenenitrile (2M3BN) is subjected to distillation by the second stage distillation, thereby separating the stream containing butadiene from the stream containing 3-pentenenitrile (3PN) and 2-methyl-3-butenenitrile (2M3BN): the stream containing 3-pentenenitrile (3PN) and 2-methyl-3-butenenitrile (2M3BN) is subjected to distillation by the third distillation, thereby separating the stream containing 3-pentenenitrile (3PN) from the stream containing 2-methyl-3-butenenitrile (2M3BN), and the detection is online Raman spectroscopy detection.

In an embodiment of the present disclosure, wherein the isomerization reaction is carried out in the second reactor, and the second reactor is selected from a tower reactor with internal separation, a multistage series tower reactor with internal separation, a stirred tank reactor, a multistage stirred tank reactor, a tubular reactor, and a multistage series tubular reactor; and the multistage series reactor is 2 to 20 stages connected in series; and the residence time of each stage of the reactor in the isomerization reaction is 0.01 to 50 hours.

In an embodiment of the present disclosure, wherein an initial molar ratio of the zero-valent nickel to 3-pentenenitrile (3PN) and 2-methyl-3-butenenitrile (2M3BN) in the isomerization reaction is 0.001 to 0.10:1, and the reaction temperature of the isomerization reaction is 100 to 175° C., and the reaction pressure is 0.5 to 5.0 MPa.

In an embodiment of the present disclosure, wherein in the second hydrocyanation reaction, the feeding molar ratio of the zero-valent nickel to 3-pentenenitrile (3PN) is 0.001 to 0.05:1, and the molar ratio of the phosphorus ligands and free phosphorus ligands to the zero-valent nickel in the second catalyst is 4 to 20:1.

In an embodiment of the present disclosure, wherein the Lewis acid is selected from the salts of elements from Groups Ib, IIb, IIIa, IIIb, IVa, IVb, Va, Vb, VIb, VIIb and VIII of the Periodic Table of the Elements, and the salt is selected from a halide, a sulfate, a sulfonate, a haloalkylsulfonate, a perhaloalkylsulfonate, a haloalkylacetate, a perhaloalkylacetate, a carboxylate, and a phosphate; preferably, the Lewis acid is selected from zinc chloride, zinc bromide, zinc iodide, manganese chloride, manganese bromide, cadmium chloride, cadmium bromide, stannous chloride, stannous bromide, stannous sulfate, stannous tartrate, indium trifluoromethanesulfonate, indium trifluoroacetate, zinc trifluoroacetate, chlorides or bromides of rare earth elements such as lanthanum, cerium, praseodymium, neodymium, samarium, europium, gadolinium, terbium, dysprosium, hafnium, erbium, thallium, ytterbium and lutetium, cobalt chloride, ferrous chloride, yttrium chloride and mixtures thereof; more preferably, the Lewis acid is zinc chloride or ferric chloride; and a feeding molar ratio of the Lewis acid to zero-valent nickel is 0.05 to 2.5.1.

In an embodiment of the present disclosure, wherein the second hydrocyanation reaction is carried out in the third reactor, and the third reactor is selected from a circulating reactor, a multistage series circulating reactor, a stirred tank reactor, a multistage series agitation reactor, a tubular reactor with premixing, a multistage series tubular reactor, a combination of the circulating reactor and the tubular reactor, a combination of the multistage series circulating reactor and the tubular reactor, a combination of the agitation reactor and the tubular reactor, a combination of the multistage series agitation reactor and the tubular reactor; and the multistage series reactor is 2 to 10 stages connected in series; and in the second hydrocyanation reaction, the residence time of each stage of the reactor is 0.5 to 50 hours.

In an embodiment of the present disclosure, wherein the post-treatment step in the step 3 comprises a distillation step, an extraction step and a five-stage distillation step which are sequentially performed, thereby obtaining a product of adiponitrile (ADN).

In an embodiment of the present disclosure, wherein the amounts of mononitrile, dinitrile, the first catalyst, the second catalyst and/or the promoter contained in each stream is optionally detected in the distillation step, the extraction step and the five-stage distillation step which are sequentially performed, and the operation condition is regulated based on the detection result to obtain an optimal separation effect for adiponitrile (ADN) (for example, the content of adiponitrile is ≥99.7% and the residual of 2-methylglutaronitrile is ≤100 ppm in the product); and the detection is online Raman spectroscopy detection.

The second aspect of the present disclosure provides a device for preparing adiponitrile, comprising: a first reactor, a second reactor, a first post-treatment equipment, third reactor, and a second post-treatment equipment which are connected in sequence, and at least one of the first reactor, the second reactor, the first post-treatment equipment, the third reactor, and the second post-treatment equipment is provided with an online Raman spectroscopy detection device, and the first reactor, the second reactor and the third reactor are respectively provided with a feed inlet and a discharge outlet.

In a certain embodiment of the present disclosure, wherein the first reactor is selected from a circulating reactor, a multistage series circulating reactor, a stirred tank reactor, a multistage series agitation reactor, a tubular reactor with premixing, a multistage series tubular reactor, a combination of the circulating reactor and the tubular reactor, a combination of the multistage series circulating reactor and the tubular reactor, a combination of the agitation reactor and the tubular reactor, or a combination of the multistage series agitation reactor and the tubular reactor; and the multistage series reactor is 2 to 10 stages connected in series, when the first reactor is operated in a single tank, the online Raman spectroscopy detection device is provided at the middle-lower end of the reactor and/or a discharge port below the reactor, and when the first reactor is connected in multi-stage series, the online Raman spectroscopy detection device is provided in each reactor and/or at the connection of each reactor and/or at the reaction liquid discharge outlet.

In a certain embodiment of the present disclosure, wherein the second reactor is selected from a tower reactor with internal separation, a multistage series tower reactor with internal separation, a stirred tank reactor, a multistage stirred tank reactor, a tubular reactor, or a multistage series tubular reactor; and the multistage series reactor is 2 to 20 stages connected in series; when the second reactor is operated in a single tank, the online Raman spectroscopy detection device is provided at the middle-lower end of the reactor and/or a discharge port below the reactor; when the second reactor is connected in multi-stage series, the online Raman spectroscopy detection device is provided in each reactor and/or at the connection of each reactor and/or at the reaction liquid discharge outlet discharge outlet; and the feed inlet of the second reactor is connected with the discharge outlet of the first reactor.

In a certain embodiment of the present disclosure, wherein the first post-treatment equipment comprises a first distillation equipment, a second distillation equipment, and a third distillation equipment, and the first distillation equipment, the second distillation equipment and the third distillation equipment are respectively provided with a feed inlet, a discharge outlet at the top of the column and a discharge outlet at the bottom of the column; in the first distillation equipment, the feed inlet is connected with the discharge outlet of the second reactor, the discharge outlet at the top of the column is connected with the feed inlet of the second distillation equipment, the discharge outlet at the bottom of the column is connected with the feed inlet of the first reactor, and the discharge outlet at the bottom of the column is also provided with a drainage port, in the second distillation equipment, the feed inlet is connected with the discharge outlet at the top of the column of the first distillation equipment, the discharge outlet at the top of the column is connected with the feed inlet of the first reactor, and the discharge outlet at the bottom of the column is connected with the third distillation equipment; and in the third distillation equipment, the feed inlet is connected with the second distillation equipment, the discharge outlet at the top of the column is connected with the feed inlet of the second reactor, and the discharge outlet at the bottom of the column is connected with the feed inlet of the third reactor.

In a certain embodiment of the present disclosure, wherein the third reactor is selected from a circulating reactor, a multistage series circulating reactor, a stirred tank reactor, a multistage series agitation reactor, a tubular reactor with premixing, a multistage series tubular reactor, a combination of circulating reactor and the tubular reactor, a combination of multistage series circulating reactor and the tubular reactor, a combination of agitation reactor and the tubular reactor, a combination of multistage series agitation reactor and the tubular reactor; and the multistage series reactor is 2 to 10 stages connected in series; when the third reactor is operated in a single tank, the online Raman spectroscopy detection device is provided at the middle-lower end of the reactor and/or a discharge port below the reactor; when the third reactor is connected in multi-stage series, the online Raman spectroscopy detection device is provided in each reactor and/or at the connection of each reactor and/or at the reaction liquid discharge outlet; and the feed inlet of the third reactor is connected with the discharge outlet at the bottom of the column of the third distillation equipment.

In a certain embodiment of the present disclosure, wherein the second post-treatment equipment comprises a fourth distillation equipment, a extraction equipment, a fifth distillation equipment, a sixth distillation equipment, a seventh distillation equipment, an eighth distillation equipment, and a ninth distillation equipment; and the fourth distillation equipment, the extraction equipment, the fifth distillation equipment, the sixth distillation equipment, the seventh distillation equipment, the eighth distillation equipment, and the ninth distillation equipment are respectively provided with a feed inlet, a discharge outlet at the top of the column, and a discharge outlet at the bottom of the column; in the fourth distillation equipment, the feed inlet is connected with the discharge outlet of the third reactor, the discharge outlet at the top of the column is connected with the feed inlet of the third reactor and/or the feed inlet of the seventh distillation equipment, the discharge outlet at the bottom of the column is connected with the feed inlet of the extraction equipment; in the extraction equipment, the feed inlet is connected with the discharge outlet at the bottom of the column of the fourth distillation equipment, the discharge outlet at the top of the column is connected with the feed inlet of the fifth distillation equipment, and the discharge outlet at the bottom of the column is connected with the feed inlet of the sixth distillation equipment; in the fifth distillation equipment, the feed inlet is connected with the discharge outlet at the top of the column of the extraction equipment, the discharge outlet at the top of the column is connected with the feed inlet of the extraction equipment, the discharge outlet at the bottom of the column is connected with the feed inlet of the third reactor and/or the feed inlet of the seventh distillation equipment; in the sixth distillation equipment, the feed inlet is connected with the discharge outlet at the bottom of the column of the extraction equipment, the discharge outlet at the top of the column is connected with the feed inlet of the third reactor, the discharge outlet at the bottom of the column is connected with the feed inlet of the eighth distillation equipment; in the seventh distillation equipment, the feed inlet is connected with the discharge outlet at the top of the column of the fourth distillation equipment and/or the discharge outlet at the top of the sixth column, the discharge outlet at the top of the column is connected with the feed inlet of the second reactor, the discharge outlet at the bottom of the column is connected with the feed inlet of the third reactor; in the eighth distillation equipment, the feed inlet is connected with the discharge outlet of the sixth distillation equipment, the discharge outlet at the top of the column is connected with the feed inlet of the ninth distillation equipment, the discharge outlet at the bottom of the column is connected with the third reactor, and the discharge outlet at the bottom of the column is also provided with a drainage port; and the feed inlet of the ninth distillation equipment is connected with the discharge outlet at the top of the column of the eighth distillation equipment.

In a certain embodiment of the present disclosure, wherein the first reactor, the second reactor, the first post-treatment equipment, the third reactor, and the second post-treatment equipment are all provided with at least one online Raman spectroscopy detection device.

The third aspect of the present disclosure provides a method for preparing adiponitrile, comprising subjecting a stream containing 3-pentenenitrile (3PN) and hydrocyanic acid to a second hydrocyanation reaction in the presence of a second catalyst and a promoter to prepare adiponitrile, wherein the stream containing 3-pentenenitrile (3PN) is prepared by the following method:

step 1: subjecting hydrocyanic acid and butadiene to a first hydrocyanation reaction in the presence of a first catalyst to form a first stream comprising 3-pentenenitrile (3PN), 2-methyl-3-butenenitrile (2M3BN), the first catalyst, and butadiene, and detecting the concentration of the hydrocyanic acid in the system, and enabling a residual amount of the hydrocyanic acid in the final first stream to be less than 10 ppm and a molar ratio of a total amount of the hydrocyanic acid to the amount of butadiene in the first hydrocyanation reaction to be 0.75 to 1.0 by regulating a ratio of raw materials, a reaction temperature, a reaction residence time, or a combination of the above modes:

step 2: subjecting the first stream obtained in step 1 to an isomerization reaction to obtain a second stream comprising a mononitrile containing 2-pentenenitrile (2PN), 3-pentenenitrile (3PN), and 4-pentenenitrile (4PN), all unreacted 2-methyl-3-butenenitrile (2M3BN), the first catalyst, and butadiene, detecting the amounts of 3-pentenenitrile (3PN) and 2-methyl-3-butenenitrile (2M3BN) in the reaction system, and enabling the ratio of 3-pentenenitrile (3PN) in the second stream to the mononitrile containing 2-pentenenitrile (2PN), 3-pentenenitrile (3PN), and 4-pentenenitrile (4PN) to be 0.8 or more by regulating the amount of the rust catalyst, the reaction temperature, the reaction residence time, or the combination of the above modes; then, obtaining a stream containing 3-pentenenitrile (3PN) by a post-treatment step:
    an online Raman spectroscopy detection is adopted for the above detection; and
    the first catalyst is selected from zero-valent nickel complexes containing phosphorus ligands and/or free phosphorus ligands.

The specific steps are described in the method for preparing adiponitrile provided in the first aspect of the present disclosure.

The fourth aspect of the present disclosure provides a method for preparing adiponitrile, comprising:
    subjecting the stream containing 3-pentenenitrile (3PN), a second catalyst and a promoter to a second hydrocyanation reaction to obtain a third stream containing the 3-pentenenitrile (3PN), the second catalyst, the promoter, and a dinitrile component containing adiponitrile (ADN), 2-methylglutaronitrile (MGN), and 2-ethylsuccinonitrile (ESN), detecting the amounts of the second catalyst, the hydrocyanic acid residue and/or 3-pentenenitrile (3PN) residue in the system, enabling a conversion rate of 3-pentenenitrile (3PN) to be 60% or more and the molar ratio of the total amount of the hydrocyanic acid to 3-pentenenitrile (3PN) in the second hydrocyanation reaction to be 0.60 to 1.0 by regulating the ratio of rave materials, the reaction temperature, the reaction residence time, or the combination of the above modes; and, obtaining an adiponitrile product by the post-treatment step;

an online Raman spectroscopy detection is adopted for the above detection;

the second catalyst is selected from zero-valent nickel complexes containing phosphorus ligands and/or free phosphorus ligands; and the promoter is a Lewis acid.

The specific steps are described in the method for preparing adiponitrile provided in the first aspect of the present disclosure.

Effect of the Disclosure

In the preparation method of the present disclosure, by online monitoring the content of relevant components in the reaction system, the reaction conditions are regulated, the ratio of materials is precisely controlled, the reaction efficiency is improved, and the operation safety and the stability of the catalyst in the reaction process are improved; and by online monitoring the content of related substances in the post-treatment process, the reaction conditions are adjusted, the recovery rate of the catalyst is ensured, and the purity of the recovered catalyst is ensured.

In the first hydrocyanation reaction of the present disclosure, by online monitoring the reaction system, a precise control of the nearly equimolar ratio of butadiene to hydrocyanic acid is realized, the amount of butadiene used is greatly reduced, and the energy consumption for recovering butadiene and the equipment investment in the subsequent reaction are reduced. Simultaneously, by monitoring the content of hydrocyanic acid in real time, it is ensured that there is substantially no residual hydrocyanic acid (<10 ppm) in the reaction liquid at the outlet of the reactor, and the operation safety and the stability of the catalyst in the reaction process are improved.

By optimizing the material ratio of the first hydrocyanation, the amount of butadiene used can be effectively reduced, the butadiene recovery operation can be omitted so that the first hydrocyanation reaction liquid can directly enter the isomerization reaction, and the equipment investment can be reduced. Meanwhile, the first hydrocyanation reaction heat can be coupled, and the energy consumption of the isomerization unit is reduced.

In the isomerization reaction of the present disclosure, by online process monitoring the reactant system, a high isomerization conversion rate and selectivity can be obtained.

In the isomerization reaction post-treatment step, by real-time monitoring of the flash unit, the distillation conditions are regulated in time, and the stability of the catalyst in the post-treatment process is improved. At the same time, by monitoring the purity of the recovered catalyst, the precise discharge and the replenishment of the catalyst can be realized.

In the second hydrocyanation reaction of the present disclosure, higher conversion rate of 3-pentenenitrile and selectivity to adiponitrile are obtained by online process monitoring of the reaction system and control of the reaction conditions. At the same time, the real-time monitoring of hydrocyanic acid ensures that there is substantially no residual hydrocyanic acid (<10 ppm), which improves the operation safety and the stability of catalysts in the treatment process.

In the treatment step after the second hydrocyanation reaction, the residue of the raw material 3-pentenenitrile in the heavy fraction can be precisely controlled by real-time monitoring of the content of the flashed heavy fraction. In addition, by real-time monitoring of the materials for continuously extracting and recovering the catalyst, the recovery rate of the catalyst in the extraction process is ensured, and the purity of the recovered catalyst can also be monitored in real-time.

REFERENCE NUMERALS

Figure 1:
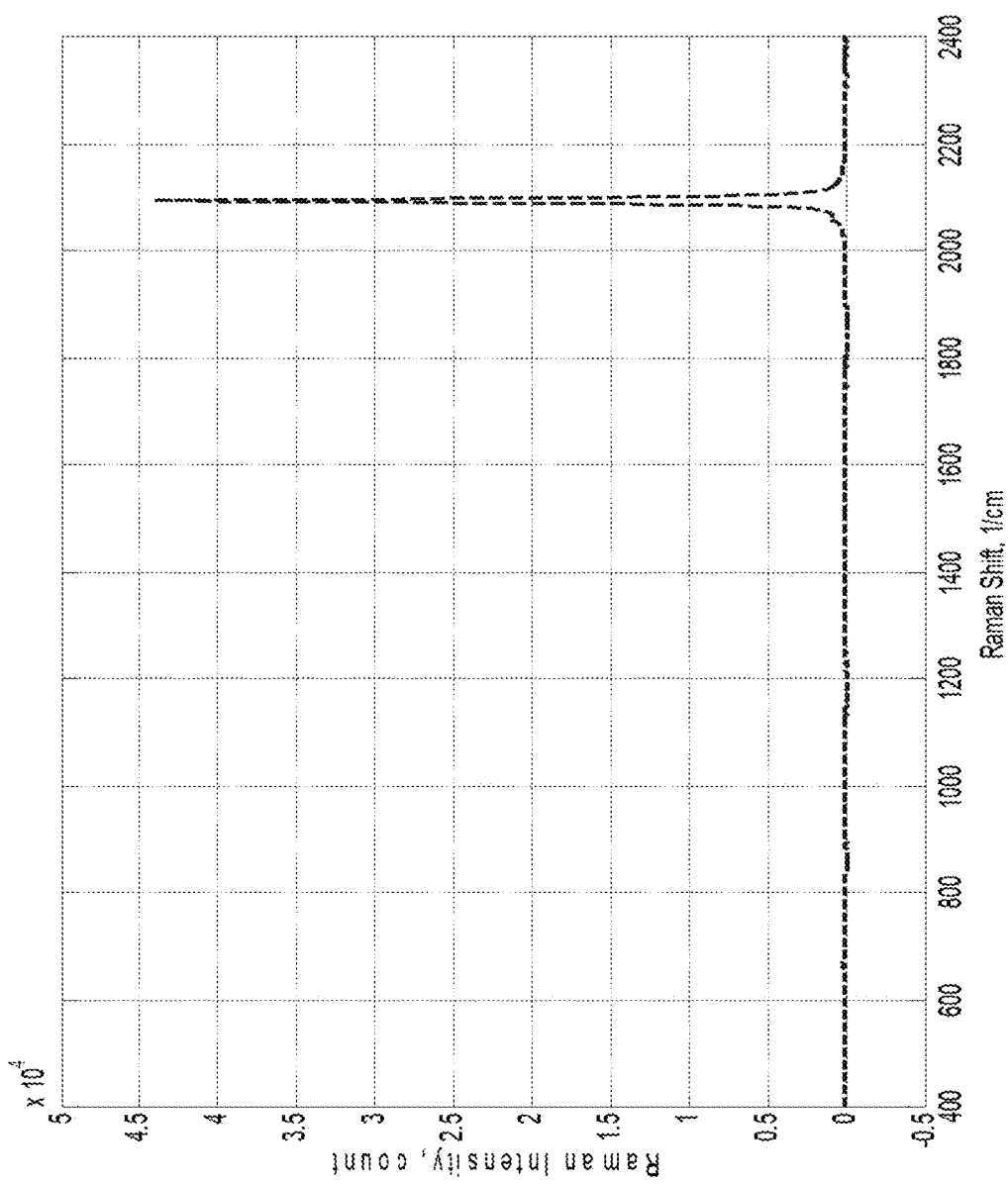
FIG. 1 is a Raman spectrum (400 to 2400 cm$^{-1}$) of HCN.
Figure 2:
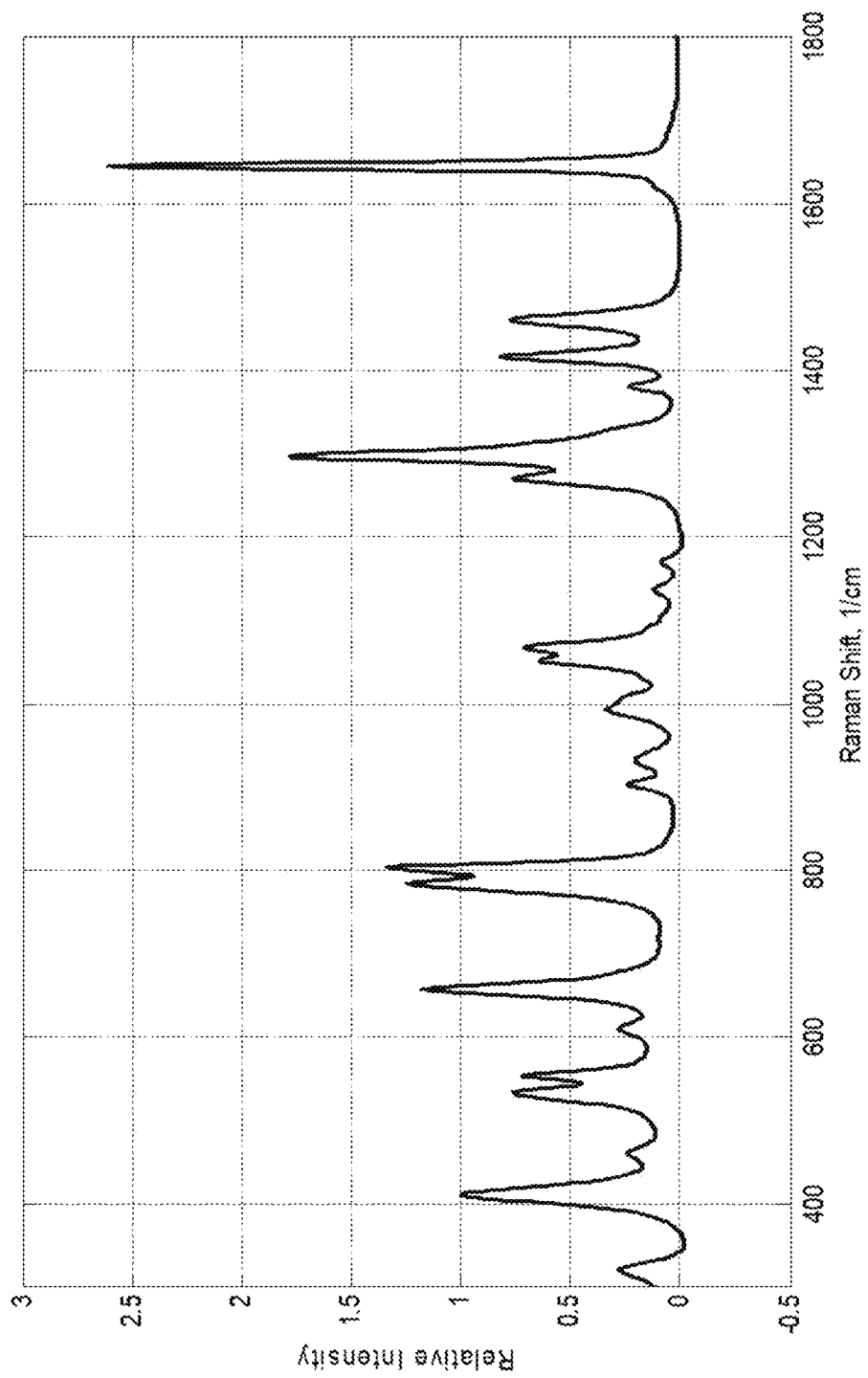
FIG. 2 is a Raman spectrum (300 to 1800 cm$^{-1}$) of 2M3BN.
Figure 3:
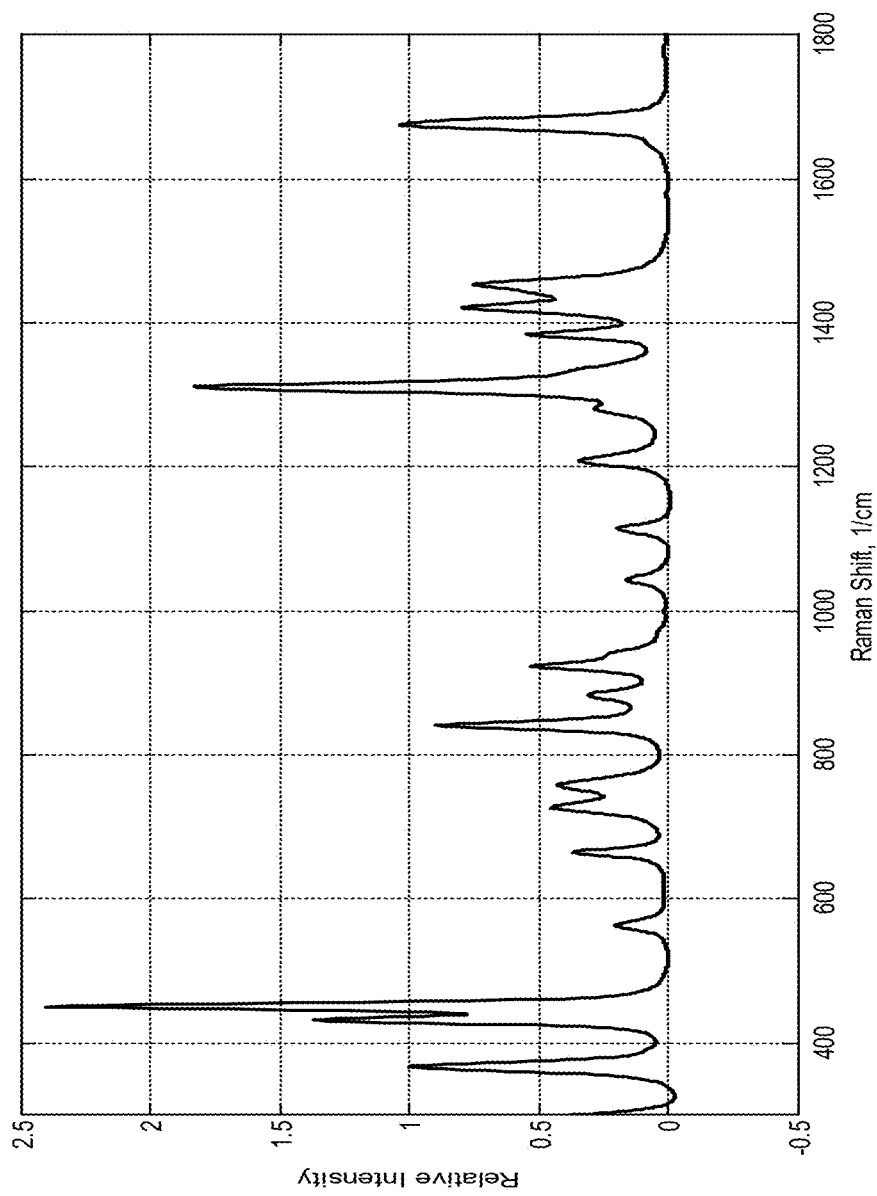
FIG. 3 is a Raman spectrum (300 to 1800 cm$^{-1}$) of 3PN.
Figure 4:
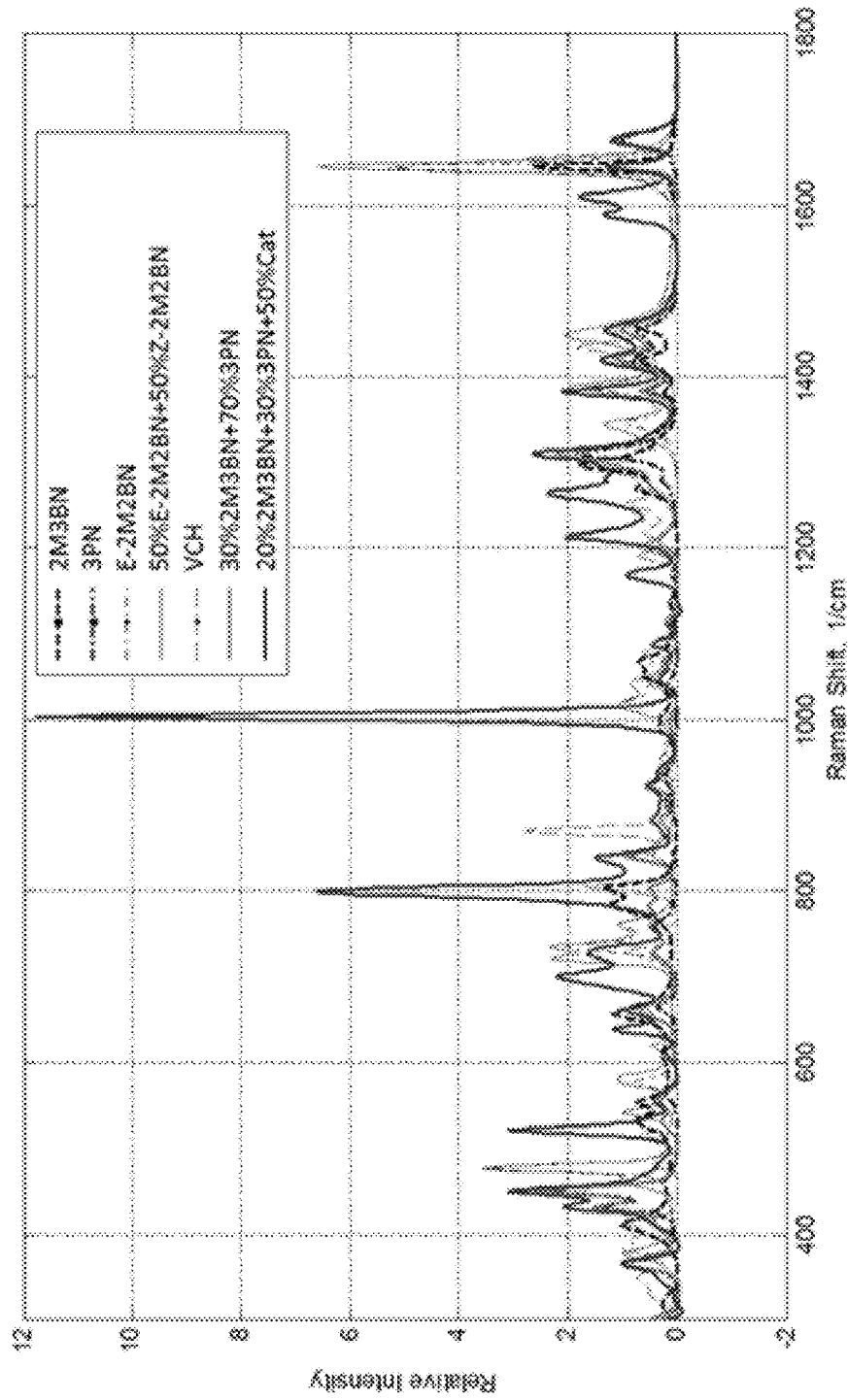
FIG. 4 is a Raman spectrum (300 to 1800 cm$^{-1}$) of the first hydrocyanation reaction liquid.
Figure 5:
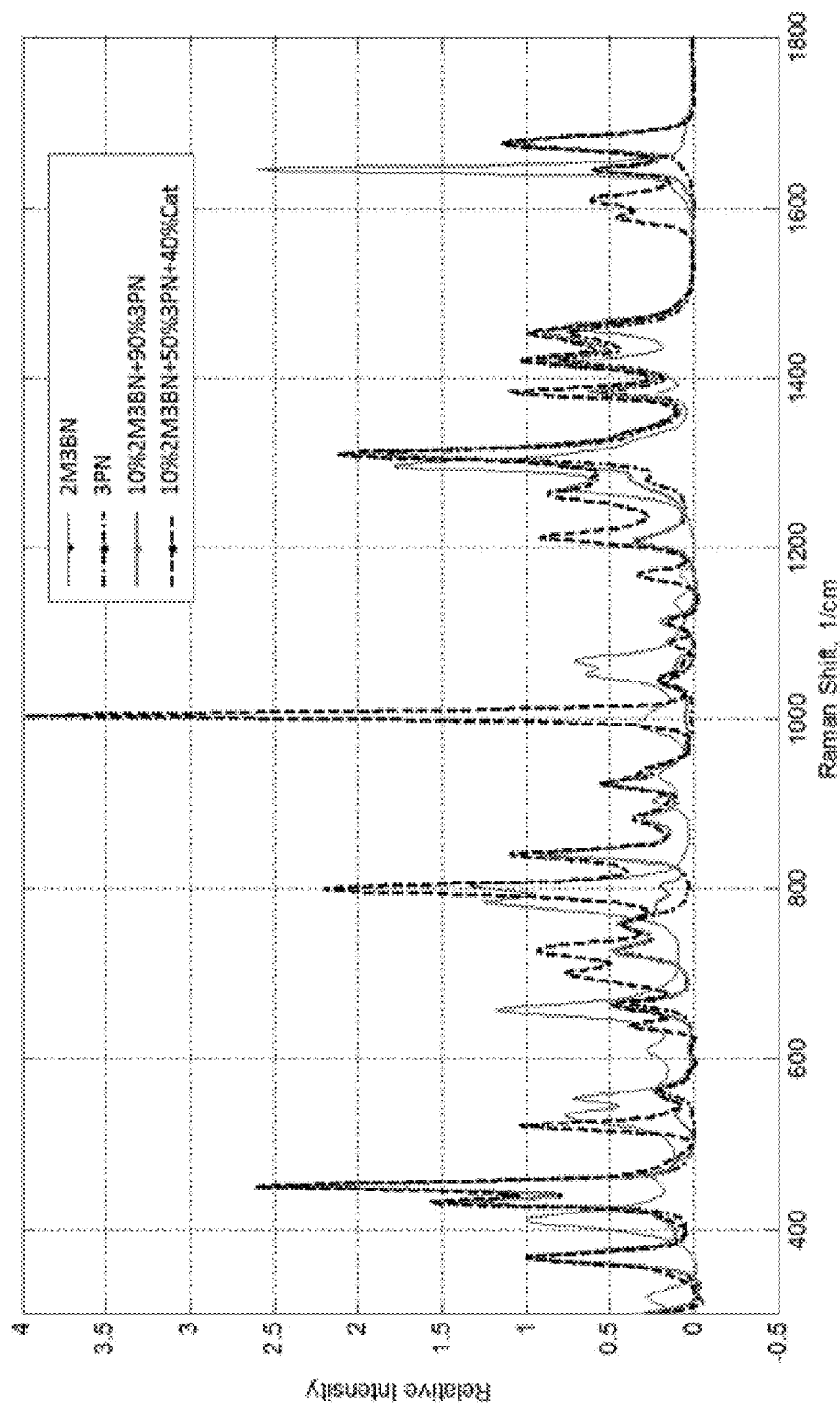
FIG. 5 is a Raman spectrum (300 to 1800 cm$^{-1}$) of the isomerization reaction liquid.
Figure 6:
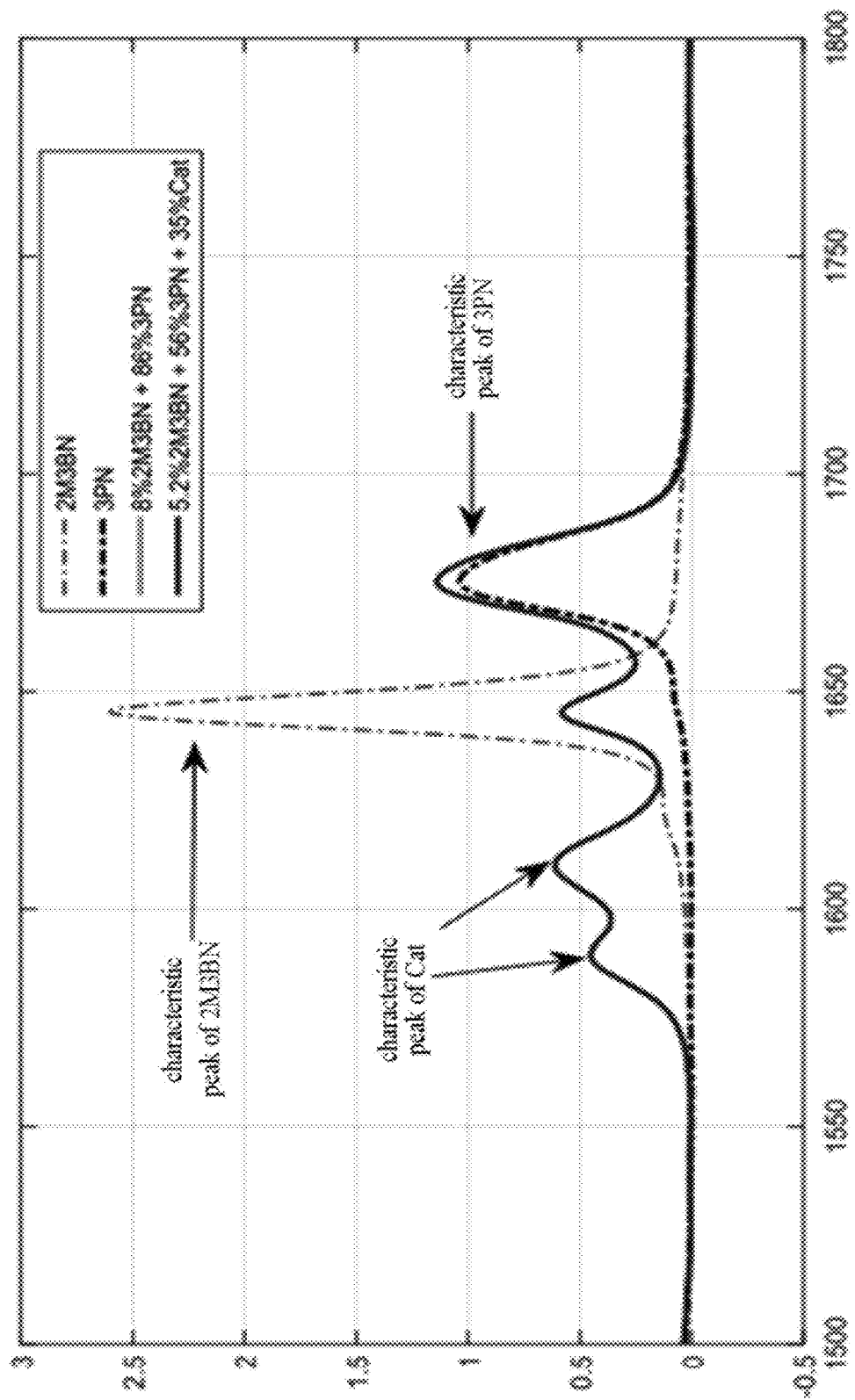
FIG. 6 is a Raman spectrum (partially enlarged) of the isomerization reaction liquid.
Figure 7:
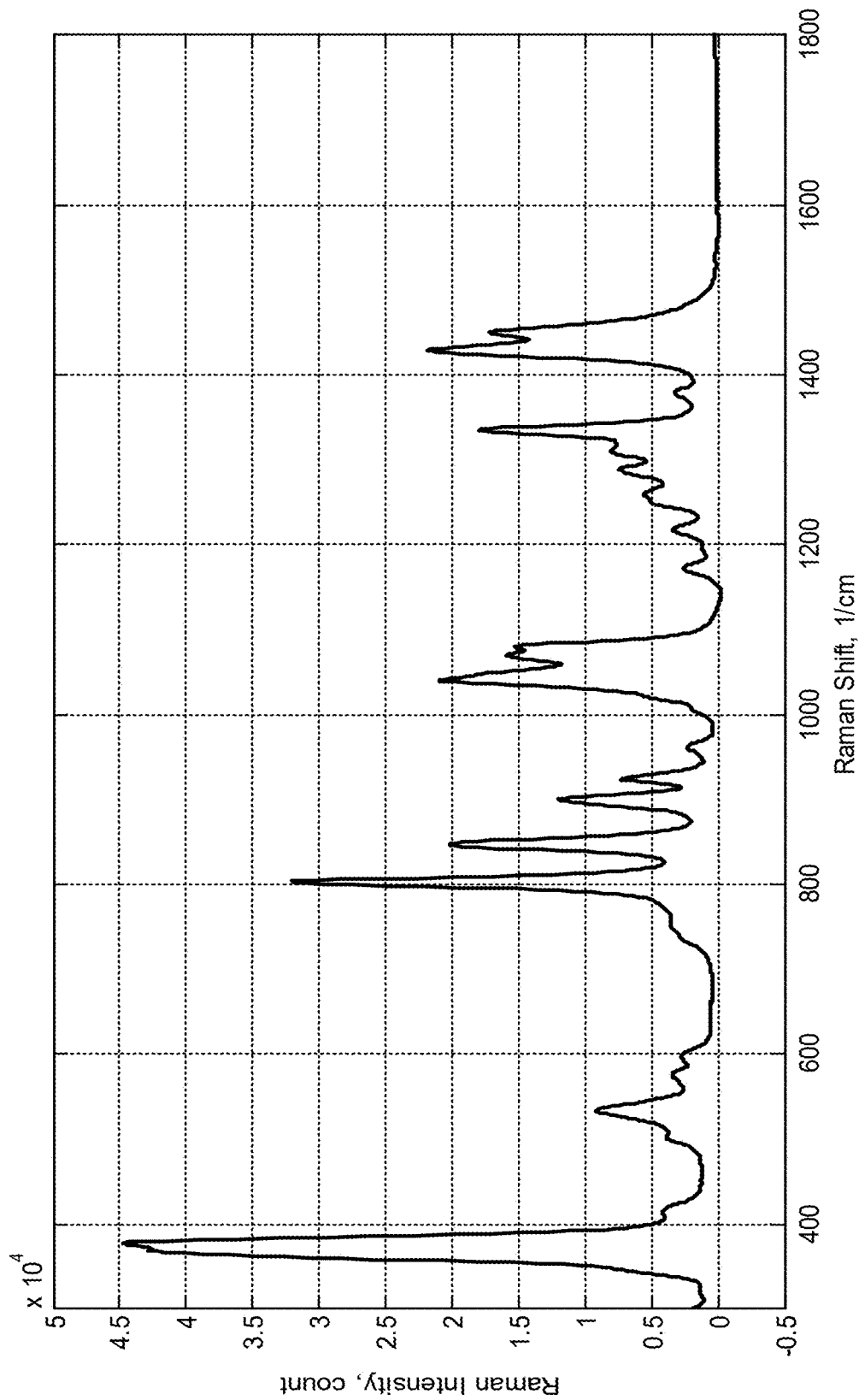
FIG. 7 is a Raman spectrum (300 to 1800 cm$^{-1}$) of ADN.
Figure 8:
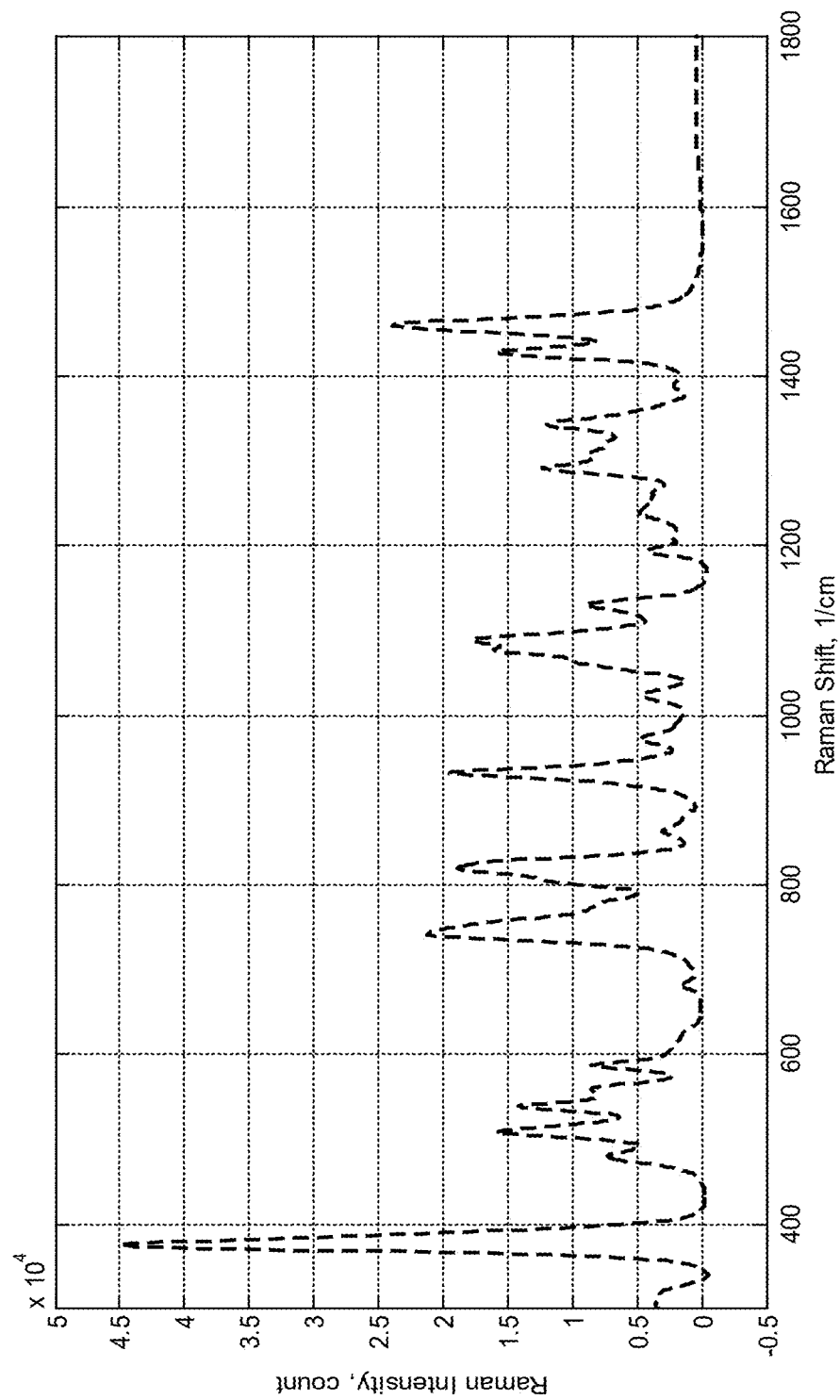
FIG. 8 is a Raman spectrum (300 to 1800 cm$^{-1}$) of MGN+ESN.
Figure 9:
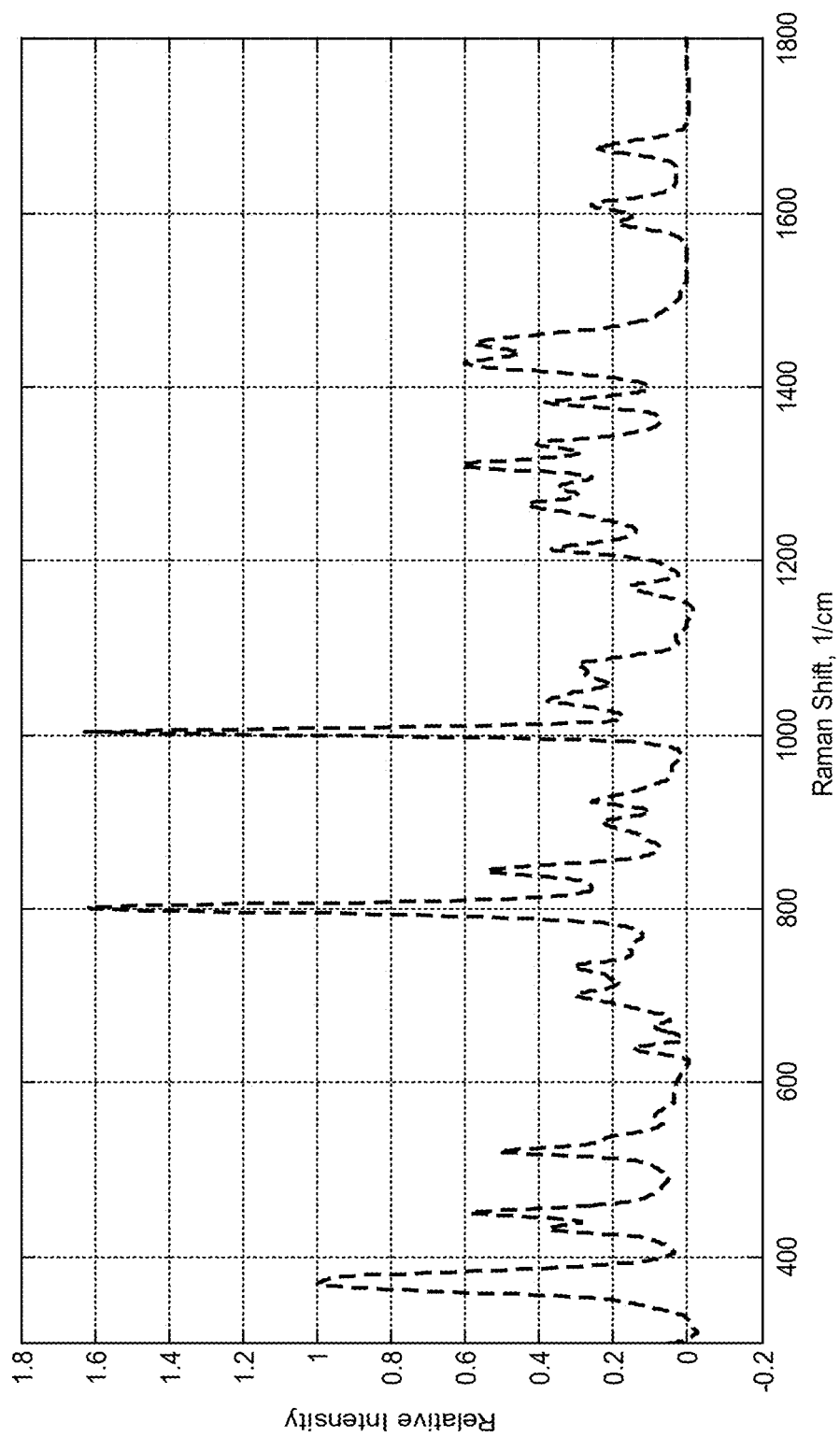
FIG. 9 is a Raman spectrum (300 to 1800 cm$^{-1}$) of the second hydrocyanation reaction liquid.
Figure 10:
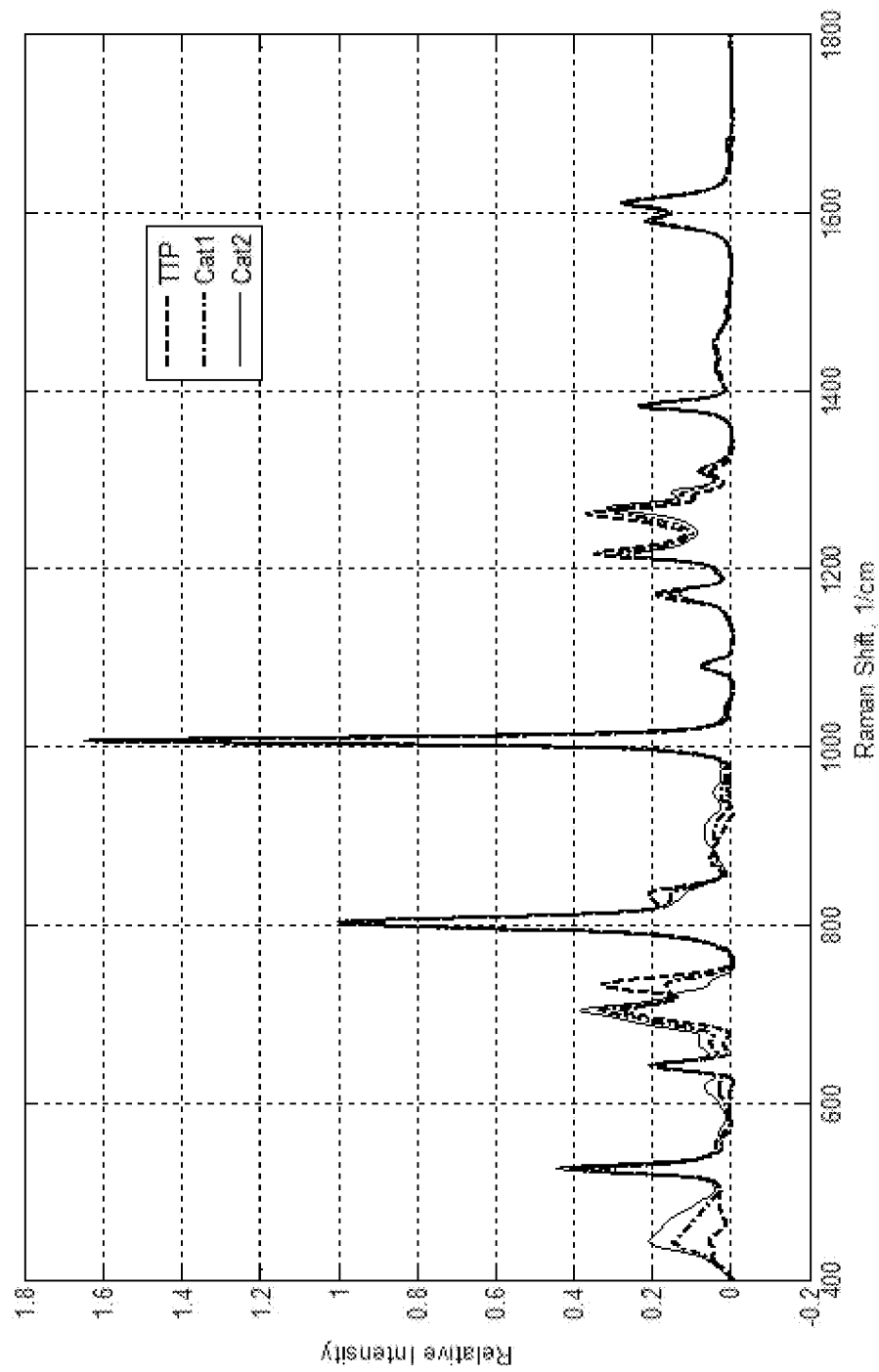
FIG. 10 is a Raman spectrum (300 to 1800 cm$^{-1}$) of the ligand and the catalyst.
Figure 11:
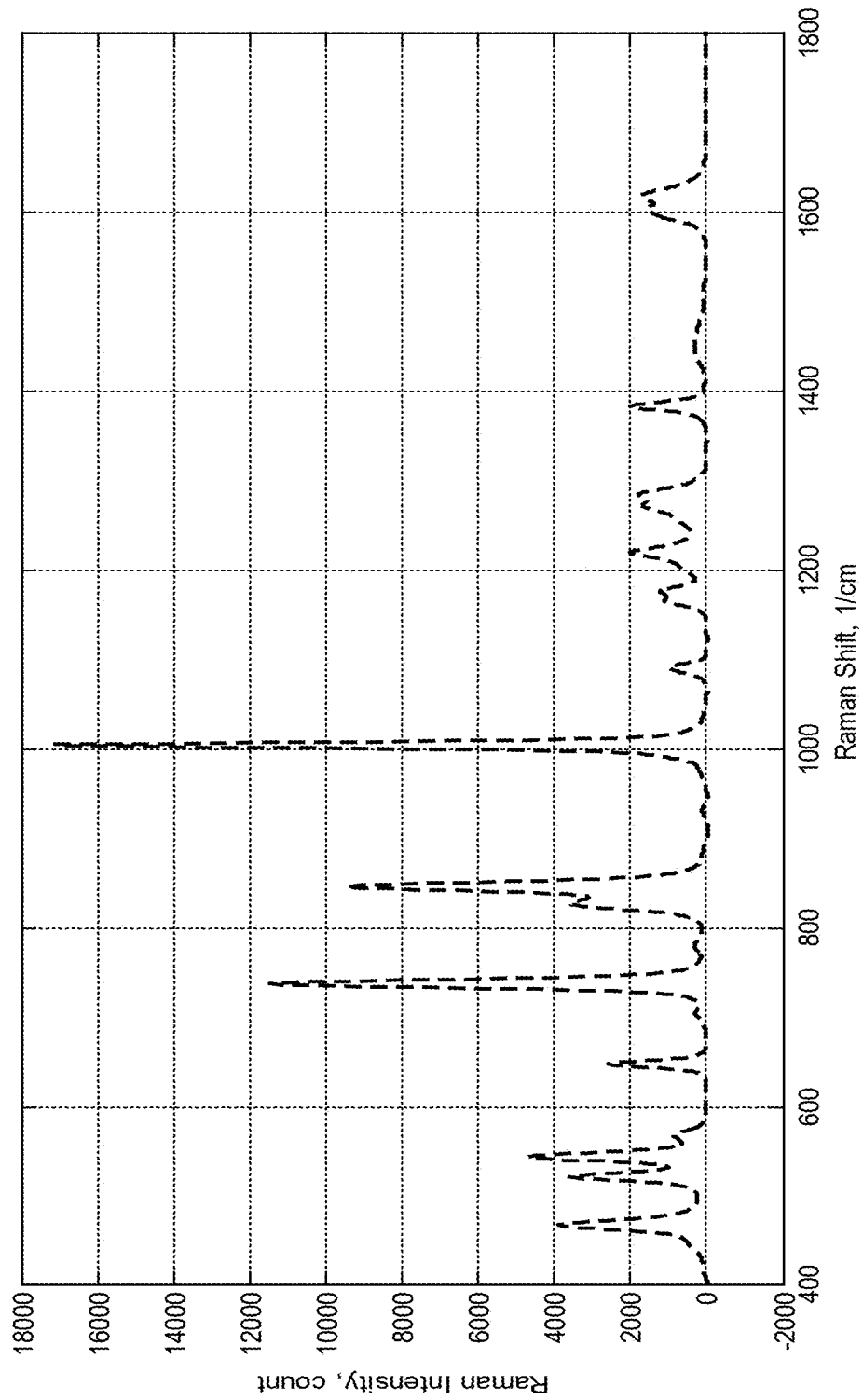
FIG. 11 is a Raman spectrum (300 to 1800 cm$^{-1}$) of p-cresol.
Figure 12:
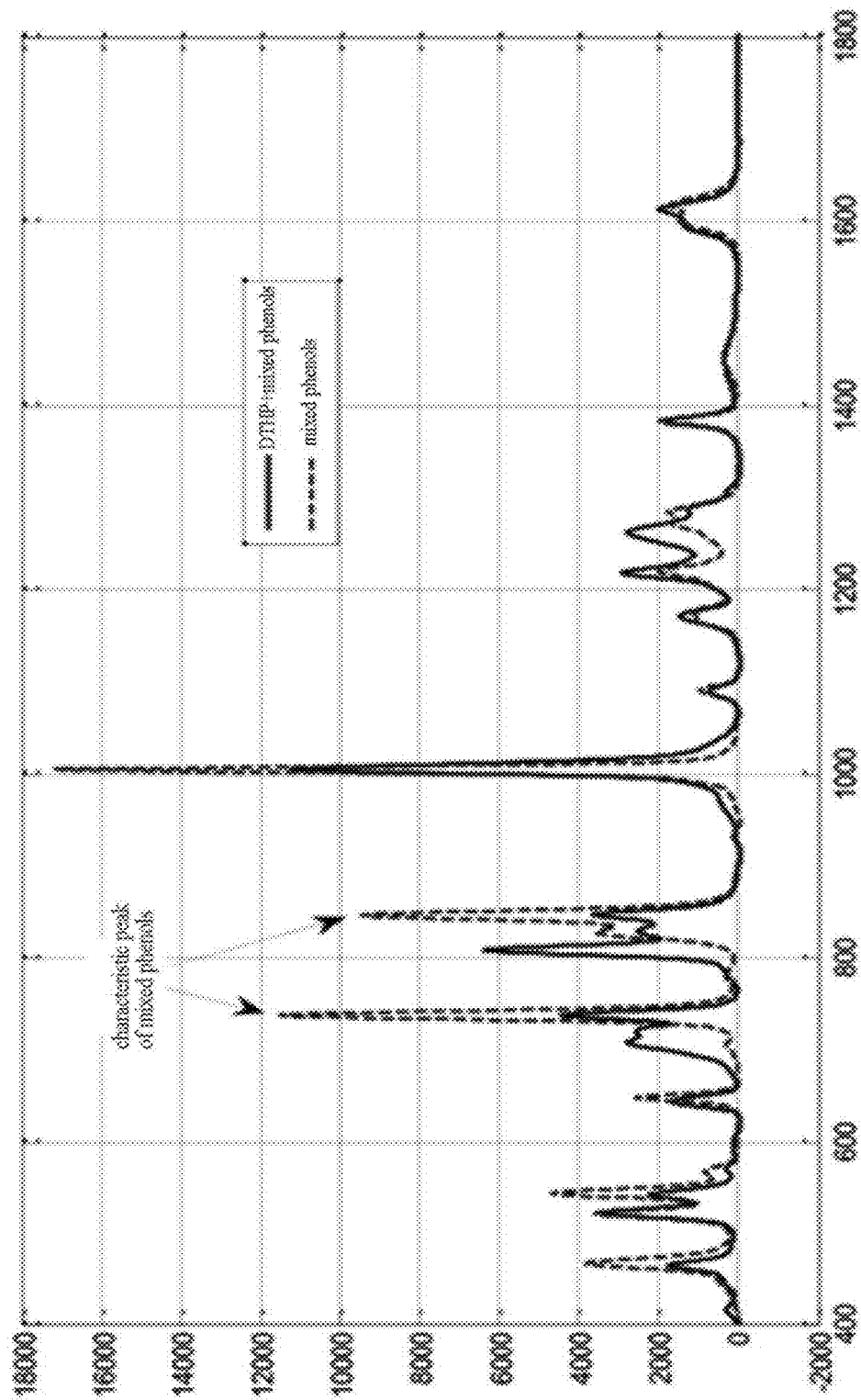
FIG. 12 is a Raman spectrum (400 to 1800 cm$^{-1}$) of catalyst hydrolysis products (DTHP and p-cresol)

R1 to R8 are reactors;
R9 is a solid-liquid separation vessel;
T1 to T4 are distillation columns;
T5 is an extraction columns;
T6 to T10 are distillation columns;
LM1 to LM18 are online Raman spectroscopy detectors;
D1 to D18 are controllers;
V1 to V5 are storage tanks;
V6 is a static stratification tank;
V7 to V17 are storage tanks.

DETAILED DESCRIPTION

Explanation of Terms in the present disclosure:
BD refers specifically to butadiene;
HCN refers specifically to hydrocyanic acid;
2PN refers specifically to 2-pentenenitrile;
3PN refers specifically to 3-pentenenitrile;

4PN refers specifically to 4-pentenenitrile;
2M3BN refers specifically to 2-methyl-3-butenenitrile;
ADN refers specifically to adiponitrile;
MGN refers specifically to 2-methylglutaronitrile;
ESN refers specifically to 2-ethylsuccinonitrile;
mononitrile includes 2PN, 3PN, and 4PN;
dinitrile includes ADN, MGN, and ESN;
Cat1 refers specifically to a first hydrocyanation reaction catalyst (first catalyst).
Cat2 refers specifically to a second hydrocyanation reaction catalyst (second catalyst).

The present disclosure provides a method for preparing adiponitrile, comprising:

step 1: subjecting hydrocyanic acid and butadiene to a first hydrocyanation reaction in the presence of a first catalyst to form a first stream comprising 3-pentenenitrile (3PN), 2-methyl-3-butenenitrile (2M3BN), the first catalyst, and butadiene, detecting the concentration of the hydrocyanic acid in the system, and enabling a residual amount of the hydrocyanic acid in the final first stream to be less than 10 ppm and a molar ratio of a total amount of the hydrocyanic acid to the amount of butadiene in the first hydrocyanation reaction to be 0.75 to 1.0 by regulating a ratio of raw materials, a reaction temperature, a reaction residence time, or a combination of the above modes:

step 2: subjecting the first stream obtained in step 1 to an isomerization reaction to obtain a second stream comprising a mononitrile containing 2-pentenenitrile (2PN), 3-pentenenitrile (3PN), and 4-pentenenitrile (4PN), an unreacted 2-methyl-3-butenenitrile (2M3BN), the first catalyst, and butadiene, detecting the amounts of 3-pentenenitrile (3PN) and 2-methyl-3-butenenitrile (2M3BN) in the reaction system, and enabling the ratio of 3-pentenenitrile (3PN) in the second stream to the mononitrile containing 2-pentenenitrile (2PN), 3-pentenenitrile (3PN), and 4-pentenenitrile (4PN) to be 0.8 or more by regulating the amount of the first catalyst, the reaction temperature, the reaction residence time, or the combination of the above modes; then, obtaining a stream containing 3-pentenenitrile (3PN) by a post-treatment step;

step 3: subjecting the hydrocyanic acid, the stream containing 3-pentenenitrile (3PN) obtained in step 2, a second catalyst and a promoter to a second hydrocyanation reaction to obtain a third stream containing the 3-pentenenitrile (3PN), the second catalyst, the promoter, and a dinitrile component containing adiponitrile (ADN), 2-methylglutaronitrile (MGN), and 2-ethylsuccinonitrile (ESN), detecting the amounts of the second catalyst, the hydrocyanic acid residue and/or 3-pentenenitrile (3PN) residue in the system, and enabling a conversion rate of 3-pentenenitrile (3PN) to be 60% or more and the molar ratio of the total amount of the hydrocyanic acid to 3-pentenenitrile (3PN) in the second hydrocyanation reaction to be 0.60 to 1.0 by regulating the ratio of raw materials, the reaction temperature, the reaction residence time, or the combination of the above modes; and, obtaining an adiponitrile product by the post-treatment step;

an online Raman spectroscopy detection is adopted for the above detection;

the first catalyst and the second catalyst are each independently selected from zero-valent nickel complexes containing phosphorus ligands and/or free phosphorus ligands;

the promoter is a Lewis acid.

The first hydrocyanation reaction of step 1 is a step in which HCN reacts with BD to produce 3PN and 2M3βN; the isomerization reaction of step 2 is a step of converting 2M3BN into 3PN; and the second hydrocyanation reaction of step 3 is a step in which HCN reacts with 3PN to produce adiponitrile.

The isomerization reaction can produce a mononitrile mixture containing pentene nitrite isomers, i.e. 2-pentenenitrile (2PN), 3-pentenenitrile (3PN), and 4-pentenenitrile (4PN).

The second hydrocyanation reaction can produce a dinitrile mixture containing adiponitrile (ADN), 2-methylglutaronitrile (MGN), and 2-ethylsuccinonitrile (ESN).

If the content of BD needs to be detected, online gas chromatography can be used.

Catalyst

The catalyst involved in the present disclosure is a zero-valent nickel complex containing a phosphorus ligand and/or a free phosphorus ligand. The contained phosphorus ligand and/or free phosphorus ligand may be a monodentate phosphorus ligand or a multidentate phosphorus ligand.

The monodentate phosphorus ligand may be phosphorus ligand, phosphite ester ligand, or hypophosphite ester ligand, and the general formula thereof can be:

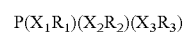

in the formula:

$X_1$, $X_2$, $X_3$ are independently represented as oxygen or a single bond.

$R_1$, $R_2$, $R_3$ are independently represented as, an identical or different, single or bridged $C_1$ to $C_4$ hydrocarbon group, such as methyl, ethyl, n-propyl, isopropyl, n-butyl, isobutyl, sec-butyl, tert-butyl, or the like; an aryl group such as phenyl, o-tolyl, m-tolyl, p-tolyl, 1-naphthyl, 2-naphthyl, 1,1'-biphenol, 1,1'-binaphthol, or the like.

The multidentate phosphorus ligand may be phosphorus ligand, phosphite ester ligand, or hypophosphite ester ligand, and the general formula thereof can be:

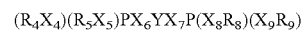

in the formula:

Y may be a $C_1$ to $C_4$ hydrocarbon group, such as —$CH_2$—, —$CH_2CH_2$—, —$CH_2CH_2CH_2$—. —$CH(CH_3)CH_2$—, —$CH_2CH_2CH_2CH_2$—, —$CH_2CH(CH_3)CH_2$—, and the like: a halogenated $C_1$ to $C_4$ hydrocarbon groups, such as —CHCl—, —CHClCHCl—, —$CH_2CHClCH_2$—, —$CH(CHCl_2)CH_2$—, —$CH_2CHFCH_2CH_2$—, —$CH_2CH(CHBr_2)CH_2$—, and the like: an unsubstituted $C_6$ to $C_{20}$ aryl group, such as phenylene, 2,2'-biphenyl, 1,1'-di-2-naphthyl, and the like.

$X_4$, $X_5$, $X_6$, $X_7$, $X_8$, and $X_9$ are independently represented as oxygen or a single bond.

$R_4$, $R_5$, $R_8$, and $R_9$ are independently represented as an identical or different, single or bridged $C_1$ to $C_4$ hydrocarbon group, such as methyl, ethyl, n-propyl, isopropyl, n-butyl, isobutyl, sec-butyl, tert-butyl, or the like; an aryl group such as phenyl, o-tolyl, m-tolyl, p-tolyl, 1-naphthyl, 2-naphthyl, 1,1'-biphenol, 1,1'-binaphthol, or the like.

In an embodiment of the present disclosure, provided is a method for preparing adiponitrile specifically comprising.

(1) First Hydrocyanation Reaction

HCN material stream 103/104/105, BD material stream 102, and Cat1 material stream 101 are continuously introduced into a first reactor to carry out a first hydrocyanation reaction to obtain a reaction stream 106/107/108 containing 3PN, 2M3BN, Cat1, and BD. The concentration of HCN in the reaction stream 106/107/108 is online monitored to regulate the conditions, such as the ratio of raw materials, the reaction temperature, the reaction residence time, so that the residual HCN in stream 108 is <10 ppm.

The ratio of the total amount of HCN to BD is 0.75 to 1.0, preferable 0.85 to 0.98, and more preferably 0.95 to 0.98.

The Cat is a zero-valent nickel complex containing a phosphorus ligand and/or a free phosphorus ligand, and the phosphorus ligand and the free phosphorus ligand of the zero-valent nickel complex are monodentate or multidentate phosphorus ligands, phosphite ligands, or hypophosphite ligands.

The feeding molar ratio of zero-valent nickel to βD is 0.001 to 0.10:1, preferably 0.005 to 0.05.1; and the total amount of phosphorus ligands and free phosphorus ligands in Cat1 to zero-valent nickel is 5 to 50:1, and preferably 10 to 30:1.

The reaction temperature of the first hydrocyanation reaction is 60 to 140° C., preferably 70 to 120° C., and the reaction pressure is 0.5 to 5.0 MPa.

The optional types of the first reactor are as described above, and the first reactor is preferably a multistage series circulating reactor, a multistage series agitation reactor, a combination of the circulating reactor and the tubular reactor, a combination of the multistage series circulating reactor and the tubular reactor, a combination of the agitation reactor and the tubular reactor, and a combination of the multistage series agitation reactor and the tubular reactor. The multistage series reactor is 2 to 10 stages connected in series, and preferably 3 to 6 stages connected in series. When the first reactor is a multistage reactor, the raw materials BD and Cat1 are directly introduced into the first stage reactor; and HCN may be introduced entirely into the first stage reactor or introduced in equal/unequal portions into the other reactors connected in series. Generally, the introduction amount of RCN of the later stage is the same or less than that of the previous stage.

In the first hydrocyanation reaction, the residence time of each stage of the reactor is 0.01 to 5.0 hours, preferably 0.05 to 2.0 hours, and most preferably 0.1 to 1.0 hours.

Further, when the content of HCN that is online monitored in the stream 106/107/108 exceeds the set range, the content of HCN can be regulated by changing the introduction amount of BD, changing the introduction amount of HCN, changing the introduction amount of Cat1, changing the reaction temperature, adjusting the reaction residence time, or coordinating the above modes. Furthermore, when the content of HCN that is online monitored in the stream 106/107 is 100 to 1000 ppm, the reaction can be carried out normally; if the content exceeds this range, it is preferable to enable the content to reach the above range by adjusting the reaction residence time, changing the reaction temperature, or coordinating the above modes; when the HCN residue that is online monitored in the stream 108 is 10 ppm or more, it is preferable to enable the HCN residue to be <10 ppm by changing the introduction amount of BD or changing the addition amount of Cat1 or changing the reaction temperature, or adjusting the reaction time and other operations, or coordinating the above modes.

The online Raman spectroscopy detection method is adopted for online monitoring.

Further, when the multistage series reactor is adopted, the reaction cooling system of the last stage reactor is not opened, and the temperature of the reaction system is controlled to be close to or equal to the temperature of the subsequent isomerization reaction by utilizing the heat released by the reaction.

(2) Isomerization Reaction

The stream 108 is introduced into a second reactor to directly carry out an isomerization reaction under the conditions of the isomerization reaction to obtain a stream 110 containing 3PN, an unreacted 2M3BN, Call, and BD: the amounts of 3PN and 2M3BN in the reaction system is online monitored, and the molar ratio of 3PN to mononitriles in stream 110 is controlled to be greater than 0.8 by regulating the amount of Cat1, the reaction temperature, or the reaction residence time, or coordinating the above modes.

The initial molar ratio of zero-valent nickel to 2M3BN and 3PN in the isomerization reaction is 0.001 to 0.10:1, preferably 0.005 to 0.05:1, and the molar ratio of the total amount of phosphorus ligands and free phosphorus ligands to zero-valent nickel in the Cat1 is 5 to 50:1, and preferably 10 to 30:1.

The reaction temperature of the isomerization reaction is 100 to 175° C., preferably 120 to 160° C.; and the reaction pressure is 0.5 to 5.0 MPa.

Further, the isomerization reaction is carried out in the second reactor, and the optional types of the second reactor are described as above; the second reactor is preferably a tower reactor with internal separation, a multistage series tower reactor with internal separation, and a multistage stirred tank reactor. The multistage series is 2 to 20 states connected in series, and preferably 2 to 10 stages connected in series.

In the isomerization reaction, the residence time of each stage of the reactor is 0.01 to 50 hours, preferably 0.05 to 20 hours, and most preferably 0.1 to 10 hours.

Further, when the molar ratio of 3PN to mononitriles that is online monitored in the stream 110 is less than 0.8, the molar ratio is regulated by increasing the amount of Cat1, increasing the reaction temperature, prolonging the reaction time, or collaboration of the above modes. The online Raman spectroscopy detection method is adopted for online monitoring.

The isomerization reaction also includes a first post-treatment step, specifically comprising:

First distillation stage: the stream 110 is distilled to obtain a stream 111 containing BD, 3PN, and 2M3BN as a top product and a stream 113 containing Cat1 as a bottom product; the total residual amount of 3PN and 2M3BN in the recycle materials at the bottom of the column T1 in the first distillation stage is online monitored, and at least one of the temperature, pressure, residence time, and reflux ratio of the first distillation stage is controlled according to the detection results to achieve an optimal separation effect (for example, the content of 3PN at the bottom of the column is 10%, the residue of 2M3BN is ≤0.5%, and the residue of butadiene is ≤50 ppm); meanwhile, the content of the deactivated catalyst in the stream at the bottom of the column T1 is online detected, and the flow amounts of the waste catalyst 112 and the catalyst 113 recycled back to the first reactor is thereby determined according to the detection results.

Second distillation stage: the stream 111 is distilled to obtain a stream 114 rich in BD as a top product, a stream 115 rich in low-boiling point impurities introduced from raw material BD, and a stream 116 containing 3PN and 2M3BN as a bottom product; preferably, the content of BD in the stream 116 is monitored by using an online Raman in combination with gas chromatography, and at least one of the temperature, pressure, residence time, and reflux ratio of the second distillation stage is controlled according to the detection results to achieve an optimal separation effect (for example, the content of butadiene in the stream 114 is ≥60%, and the content of butadiene in the stream 116 is 20 ppm).

Third distillation stage: the stream 116 is distilled to obtain a stream 117 containing 2M3BN as a top product and a stream 118 containing 3PN as a bottom product; preferably, the residual amount of 2M3BN in the stream 118 is online monitored, and at least one of the temperature, pressure, residence time, and reflux ratio of the third distillation stage is controlled according to the detection results to achieve an optimal separation effect (for example, the content of 2M3BN in the stream 117 is ≥85%, and the content of 3PN is ≥98% and the content of 2M3BN is ≤0.5% in the stream 118).

The online Raman spectroscopy detection method is adopted for online monitoring.

Further, the distillation temperature of the first distillation stage is controlled to be 80 to 140° C., and the distillation pressure is controlled to be 0.02 to 0.2 MPa.

Further, the distillation temperature of the second distillation stage is controlled to be 40 to 100° C.; and the distillation pressure is controlled to be 0.02 to 0.2 MPa.

Further, the distillation temperature of the third distillation stage is controlled to be 80 to 120° C.; and the distillation pressure is controlled to be 0.02 to 0.1 MPa.

Further, the stream 114 containing BD is at least recycled into the first reactor; and the stream 113 containing Cat1 is at least partially recycled into the first reactor.

Furthermore, at least part of the stream at the bottom of the column T1 containing Cat1 is discharged from the system as a discharge stream 112, and the specific discharge amount is determined by the content of impurities in the catalyst detected by online Raman detection, which is usually 0.005 to 0.10 times of the total amount of Call.

Further, the stream 117 containing 2M3BN is at least partially recycled into the second reactor.

(3) Second Hydrocyanation Reaction

Material stream 203/204 of HCN, material stream 118 of 3PN, material stream 201 of Cat2, and stream 202 of the promoter are continuously introduced into a third reactor to carry out a reaction to obtain a stream 205/206 containing the mononitriles, Cat2, Cat2 degradation products, the promoter, dinitriles, and the like. Online monitoring the amount of HCN residue in the stream 205, so as to adjust the ratio of HCN material stream 203/204, and, online monitoring the amount of Cat2. HCN residue, and 3PN residue in the stream 206, thereby regulate the conditions such as the ratio of raw materials, the reaction temperature, the reaction residence time and the like to enable the HCN residue in stream 207 to be <10 ppm and ensure that the conversion rate of 3PN is greater than or equal to 60%.

The ratio of the total molar amount of HCN to 3PN in the second hydrocyanation reaction is 0.60 to 1.0, and preferably 0.70 to 0.95.

The Cat2 is a zero-valent nickel complex containing a phosphorus ligand and/or a free phosphorus ligand. The phosphorus ligand and the free phosphorus ligand of the zero-valent nickel complex are monodentate or multidentate phosphorus, phosphite, and hypophosphite ligands.

The feeding molar ratio of the zero-valent nickel to 3PN is 0.001 to 0.05:1, preferably 0.005 to 0.05:1, and the total amount of phosphorus ligands and free phosphorus ligands in Cat2 to zero-valent nickel is 4 to 20:1, and preferably 6 to 15:1.

The promoter is a Lewis acid, which is a salt selected from Groups Ib, IIb, IIIa, IIIb, IVa, IVb, Va, Vb, VIb, VIIb and VIII of the Periodic Table of the Elements, and the salt is selected from a halide, a sulfate, a sulfonate, a haloalkylsulfonate, a perhaloalkylsulfonate, a haloalkylacetate, a perhaloalkylacetate, a carboxylate, and a phosphate. As preferred, the Lewis acid is selected from zinc chloride, zinc bromide, zinc iodide, manganese chloride, manganese bromide, cadmium chloride, cadmium bromide, stannous chloride, stannous bromide, stannous sulfate, stannous tartrate, indium trifluoromethanesulfonate, indium trifluoroacetate, zinc trifluoracetate, chlorides or bromides of rare earth elements such as lanthanum, cerium, praseodymium, neodymium, samarium, europium, gadolinium, terbium, dysprosium, hafnium, erbium, thallium, ytterbium and lutetium, cobalt chloride, ferrous chloride, yttrium chloride and mixtures thereof. More preferably, the Lewis acid is zinc chloride and ferric chloride; and the feeding molar ratio of the Lewis acid to zero-valent nickel is 0.05 to 2.5:1, and preferably 0.2 to 2.0:1.

The reaction temperature of the second hydrocyanation reaction is 40 to 100° C., preferably 50 to 80° C., and the reaction pressure is 0.1 to 0.5 MPa.

Further, the second hydrocyanation reaction is carried out in a third reactor unit, and the optional types of the third reactor unit are as described above; and the third reactor unit is preferably a multistage series circulating reactor, a multistage series agitation reactor, a combination of the circulating reactor and the tubular reactor, a combination of the multistage series circulating reactor and the tubular reactor, a combination of the agitation reactor and the tubular reactor, and a combination of the multistage series agitation reactor and the tubular reactor. Said multistage series reactor is 2 to 10 stages connected in series, and preferably 3 to 6 stages connected in series. When the third reactor is a multi-stage reactor, material stream 118 of the raw material 3PN, material stream 201 of Cat2, and stream 202 of the promoter are directly introduced into the third stage reactor, and HCN may be introduced entirely into the first stage reactor or introduced in equal/unequal portions into the other reactors connected in series. Generally, the introduction amount of HCN of the later stage is the same or less than that of the previous stage.

In the said third hydrocyanation reaction, the residence time of each stage of the reactor is 0.5 to 50 hours, preferably 1 to 30 hours, and most preferably 2 to 20 hours.

Further, when the amount of HCN residue that is online monitored in the stream 205/206/207 exceeds the set range, regulation is conducted by changing the introduction amount of the material stream 118 of 3PN, changing the introduction amount of the material stream 203/204 of HCN, changing the introduction amount of the material stream 201 of Cat2, changing the introduction amount of the material 202 of the promoter, changing the reaction temperature, adjusting the reaction residence time, or collaboration of the above modes. Furthermore, when the content of HCN that is online monitored in the stream 205/206 is 100 to 1000 ppm, the reaction can be carried out normally; if the content exceeds this range, it is preferable to enable the content reach the above range by adjusting the reaction residence time, changing the reaction temperature, or collaboration of the above modes, when the HCN residue that is online monitored in the stream 207 is 10 ppm or more, it is preferable to enable the HCN residue to be <10 ppm by changing the introduction amount of 3PN or the addition amount of Cat2, changing the reaction temperature, adjusting the reaction time and other operations, or collaboration of the above modes.

The online Raman spectroscopy detection method is adopted for online monitoring.

Said second hydrocyanation reaction also includes a post-treatment step, specifically comprising:

Fourth distillation stage: the stream 206 is distilled to obtain a stream 207 rich in mononitriles as a top product and a stream 209 containing said Cat2 and Cat2 degradation products, said promoter, dinitriles and small amounts of mononitriles as a bottom product; the molar ratio of mononitrils to dinitriles in the stream 209 is online monitored, and at least one of the temperature, pressure, residence time, and reflux ratio of the fourth distillation stage is controlled according to the detection results to control the molar ratio of the mononitrils to dinitriles in the stream 209 to be 0.1:1 or below.

The stream 209 is subjected to static stratification to obtain a stream 210 containing a portion of Cat2 and a stream 211 containing small amounts of Cat2. Cat2 degradation products, said promoter, and dinitriles. At least a portion of the stream 210 is recycled for the second hydrocyanation reaction in the third reactor. The amount of the catalyst in the stream 210 is online monitored to determine the amount of fresh catalyst material stream 201 that needs to be replenished.

Extraction stage: a stream 212 is extracted with the use of an extractant to obtain a stream 214 containing Cat2 and rich in extractant as an extract phase and a stream 213 depleted of the extract phase and containing Cat2 degradation products, said at least one promoter, dinitriles and small amounts of mononitriles as a raffinate phase; and said extractant is selected from n-hexane, n-heptane, isomeric $C_6$, $C_7$, $C_5$, and $C_9$ aliphatic compounds, isomeric $C_6$, $C_7$, $C_8$, and $C_9$ cycloaliphatic compounds, cis-decahydronaphthalene, trans-decahydronaphthalene, and mixtures thereof; and cyclohexane and methylcyclohexane are preferred. The amount of the extractant is 0.5 to 5.0 times to the mass of the reaction liquid.

The extraction temperature of said extraction stage is 20 to 80° C., and the pressure is 0.01 to 1 MPa.

Fifth distillation stage: the stream 214 is distilled to obtain a stream 216 containing an extractant as a top product and a stream 215 containing Cat2 as a bottom product; the content of Cat2 and compositions in the stream 215 is online monitored, and at least pan of the stream 215 is recycled for the first hydrocyanation reaction or isomerization reaction or second hydrocyanation reaction.

The stream 213 containing Cat2 degradation products, said at least one promoter, dinitriles, and small amounts of mononitriles is subjected to neutralization, centrifugation, and the like to remove the solid catalyst residue material stream 217 while obtaining a material stream 218 containing Cat2 degradation products, small amounts of the promoter, dinitriles, and small amounts of mononitriles.

Sixth distillation stage: the stream 218 is distilled to obtain a stream 220 containing mononitriles as a top product and a stream 219 containing Cat2 degradation products, small amounts of the promoter and dinitriles as a bottom product; preferably, the residual amount of mononitriles in the material stream at the bottom of the column is online monitored, and at least one of the temperature, pressure, residence time, and reflux ratio of the sixth distillation stage is controlled according to the detection results to achieve an optimal separation effect (fix example, the content of dinitriles in the stream 220 is ≤1%, and the content of mononitriles in the stream 219 is ≤0.5%).

Seventh distillation stage: the stream 208 and/or stream 220 are combined and at least partially distilled to obtain a stream 221 depleted of 2PN and a stream 222 rich in 2PN, and the stream 221 is at least partially recycled into the third reactor, and the stream 222 is discharged as waste.

Eighth distillation stage: the stream 219 is distilled to obtain a stream 224 containing dinitriles as a top product and a stream 223 containing Cat2 degradation products and small amounts of the promoter as a bottom product; preferably, the residual amount of dinitriles in the stream at the bottom of the column is online monitored, and at least one of the temperature, pressure, residence time, and reflux ratio of the eighth distillation stage is controlled according to the detection results to achieve an optimal separation effect (for example, the content of dinitriles in the stream 223 is ≤20%, and the content of dinitriles in the stream 224 is ≥98%).

Ninth distillation stage: the stream 224 is distilled to obtain a stream 226 containing MGN and ESN as a top product and a stream 225 containing ADN as a bottom product; preferably, the residual amount of MGN and ESN in the stream 225 is online monitored, and at least one of the temperature, pressure, residence time, and reflex ratio of the ninth distillation stage is controlled according to the detection results.

Further, the distillation temperature of said fourth distillation stage is controlled to be 40 to 180° C.; and the distillation pressure is controlled to be 0.001 to 0.1 MPa.

Further, the distillation temperature of said fifth distillation stage is controlled to be 40 to 120° C.; and the distillation pressure is controlled to be 0.001 to 0.2 MPa.

Further, the distillation temperature of said sixth distillation stage is controlled to be 30 to 180° C.; and the distillation pressure is controlled to be 0.001 to 0.1 MPa.

Further, the distillation temperature of said seventh distillation stage is controlled to be 40 to 250° C.; and the distillation pressure is controlled to be 0.001 to 0.2 MPa.

Further, the distillation temperature of said eighth distillation stage is controlled to be 60 to 250° C., and the distillation pressure is controlled to be 0.001 to 0.05 MPa.

Further, the distillation temperature of said ninth distillation stage is controlled to be 60 to 200° C.; and the distillation pressure is controlled to be 0.001 to 0.05 MPa.

Further, said stream 216 containing the extractant is at least partially recycled to the extraction stage.

Further, said stream 217 containing Cat2 is at least partially recycled into the first reactor, the second reactor or the third reactor.

Another aspect of the present disclosure provides a production system for preparing adiponitrile, specifically comprising: a first reactor, a second reactor, a first post-treatment equipment, a third reactor, and a second post-treatment equipment.

At least one of the first reactor, the second reactor, the first post-treatment equipment, the third reactor, and the second post-treatment equipment is provided with an online Raman spectroscopy detection device; preferably, the first reactor, the second reactor, the first post-treatment equipment, the third reactor, and the second post-treatment equipment are all provided with at least one online Raman spectroscopy detection device.

The optional types of the first reactor are as described above. When the first reactor is operated in a single tank, the online Raman spectroscopy detection device is provided at the middle-lower end of the reactor and/or a discharge port below the reactor; when the first reactor is connected in multi-stage series, the online Raman spectroscopy detection device is provided in each reactor and/or at the connection of each reactor and/or at the reaction liquid discharge outlet. Said first reactor is also provided with a feed inlet and a discharge outlet.

The optional types of the second reactor are as described above. When the second reactor is operated in a single tank, the online Raman spectroscopy detection device is provided at the middle-lower end of the reactor and/or a discharge port below the reactor; when the second reactor is connected in multi-stage series, the online Raman spectroscopy detection device is provided in each reactor and/or at the connection of each reactor and/or at the reaction liquid discharge outlet. Said second reactor is also provided with a feed inlet and a discharge outlet. The feed inlet of said second reactor is connected with the discharge outlet of the first reactor.

Said first post-treatment equipment is a first distillation equipment, a second distillation equipment, and a third distillation equipment. Said first distillation equipment, the second distillation equipment, and the third distillation equipment can be a tray tower, a structured packing column, a random packed column, and an evaporator (evaporator such as a falling film evaporator, a film evaporator, a flash evaporator, a spiral evaporator, a self circulating evaporator, and the like). Said first distillation equipment, the second distillation equipment, and the third distillation equipment can be single-stage or multi-stage. Said first distillation equipment, the second distillation equipment, and the third distillation equipment are provided with a feed inlet, a discharge outlet at the top of the column, and a discharge outlet at the bottom of the column. In said first distillation equipment, the feed inlet is connected with the discharge outlet of the second reactor, the discharge outlet at the top of the column is connected with the feed inlet of the second distillation equipment, the discharge outlet at the bottom of the column is connected with the feed inlet of the first reactor, and the discharge outlet at the bottom of the column is also provided with a drainage port. In said second distillation equipment, the feed inlet is connected with the discharge outlet at the top of the column of the first distillation equipment, the discharge outlet at the top of the column is connected with the feed inlet of the first reactor, and the discharge outlet at the bottom of the column is connected with the third distillation equipment. In said third distillation equipment, the feed inlet is connected with the second distillation equipment, the discharge outlet at the top of the column is connected with the feed inlet of the second reactor, and the discharge outlet at the bottom of the column is connected with the feed inlet of the third reactor.

The optional types of the third reactor are as described above. When the third reactor is operated in a single tank, the online Raman spectroscopy detection device is provided at the middle-lower end of the reactor and/or a discharge port below the reactor; when the third reactor is connected in multi-stage series, the online Raman spectroscopy detection device is provided in each reactor and/or at the connection of each reactor and/or at the reaction liquid discharge outlet. Said third reactor is also provided with a feed inlet and a discharge outlet. Said third reactor is also provided with a feed inlet that is connected with the discharge outlet at the bottom of the column of the third distillation equipment, and a discharge outlet that is connected with the feed inlet of the fourth distillation equipment.

Said second post-treatment equipment is fourth distillation equipment, extraction equipment, fifth distillation equipment, sixth distillation equipment, seventh distillation equipment, eighth distillation equipment, and ninth distillation equipment. Said fourth distillation equipment, the fifth distillation equipment, the sixth distillation equipment, the seventh distillation equipment, the eighth distillation equipment, and the ninth distillation equipment can be a tray tower, a structured packing column, a random packed column, and an evaporator (evaporator such as a falling film evaporator, a film evaporator, a flash evaporator, spiral evaporator, a self-circulating evaporator, and the like); said extraction equipment can be any conventional liquid-liquid extraction equipment, such as a static mixer, an agitated vessel, a mixer-settler, a rotating disc extractor, an extractor with centrifugation, a column with perforated plates or packing, or the like. Said fourth distillation equipment, the extraction equipment, the fifth distillation equipment, the sixth distillation equipment, the seventh distillation equipment, the eighth distillation equipment, and the ninth distillation equipment can be single-stage or multi-stage. Said fourth distillation equipment, the extraction equipment, the fifth distillation equipment, the sixth distillation equipment, the seventh distillation equipment, the eighth distillation equipment, and the ninth distillation equipment are provided with a feed inlet, a discharge outlet at the top of the column, and a discharge outlet at the bottom of the column. In said fourth distillation equipment, the feed inlet is connected with the discharge outlet of the third reactor, the discharge outlet at the top of the column is connected with the feed inlet of the third reactor and/or the feed inlet of the seventh distillation equipment, and the discharge outlet at the bottom of the column is connected with the feed inlet of the extraction equipment. In said extraction equipment, the feed inlet is connected with the discharge outlet at the bottom of the column of the fourth distillation equipment, the discharge outlet at the top of the column is connected with the feed inlet of the fifth distillation equipment, and the discharge outlet at the bottom of the column is connected with the feed inlet of the sixth distillation equipment. In said fifth distillation equipment, the feed inlet is connected with the discharge outlet at the top of the column of the extraction equipment, the discharge outlet at the top of the column is connected with the feed inlet of the extraction equipment, and the discharge outlet at the bottom of the column is connected with the feed inlet of the third reactor and/or the feed inlet of the seventh distillation equipment. In said sixth distillation equipment, the feed inlet is connected with the discharge outlet at the bottom of the column of the extraction equipment, the discharge outlet at the top of the column is connected with the feed inlet of the third reactor, and the discharge outlet at the bottom of the column is connected with the feed inlet of the eighth distillation equipment. In said seventh distillation equipment, the feed inlet is connected with the discharge outlet at the top of the column of the fourth distillation equipment and/or the discharge outlet at the top of the sixth column, the discharge outlet at the top of the column is connected with the feed inlet of the second reactor, and the discharge outlet at the bottom of the column is connected with the feed inlet of the third reactor. In said eighth distillation equipment, the feed inlet is connected with the discharge outlet of the sixth distillation equipment, the discharge outlet at the top of the column is connected with the feed inlet of the ninth distillation equipment, the discharge outlet at the bottom of the column is connected with the third reactor, and the discharge outlet at the bottom of the column is also provided with a drainage port. The feed inlet of the ninth distillation equipment is connected with the discharge outlet at the top of the column of the eighth distillation equipment.

Figure 14:
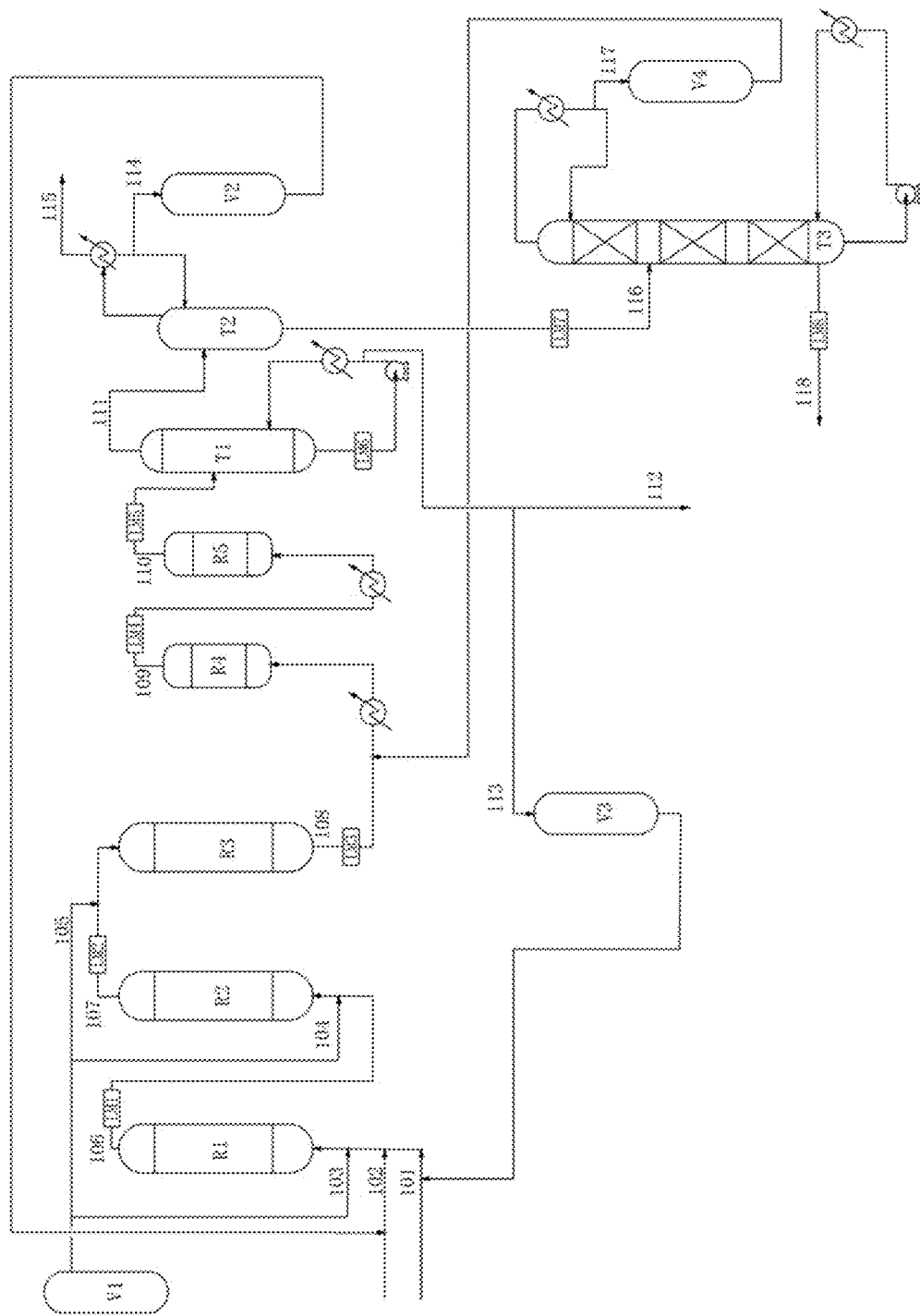
FIG. 14 is a chart of a preferred system of the first hydrocyanation reaction+the isomerization reaction the first post-treatment.
Figure 15:
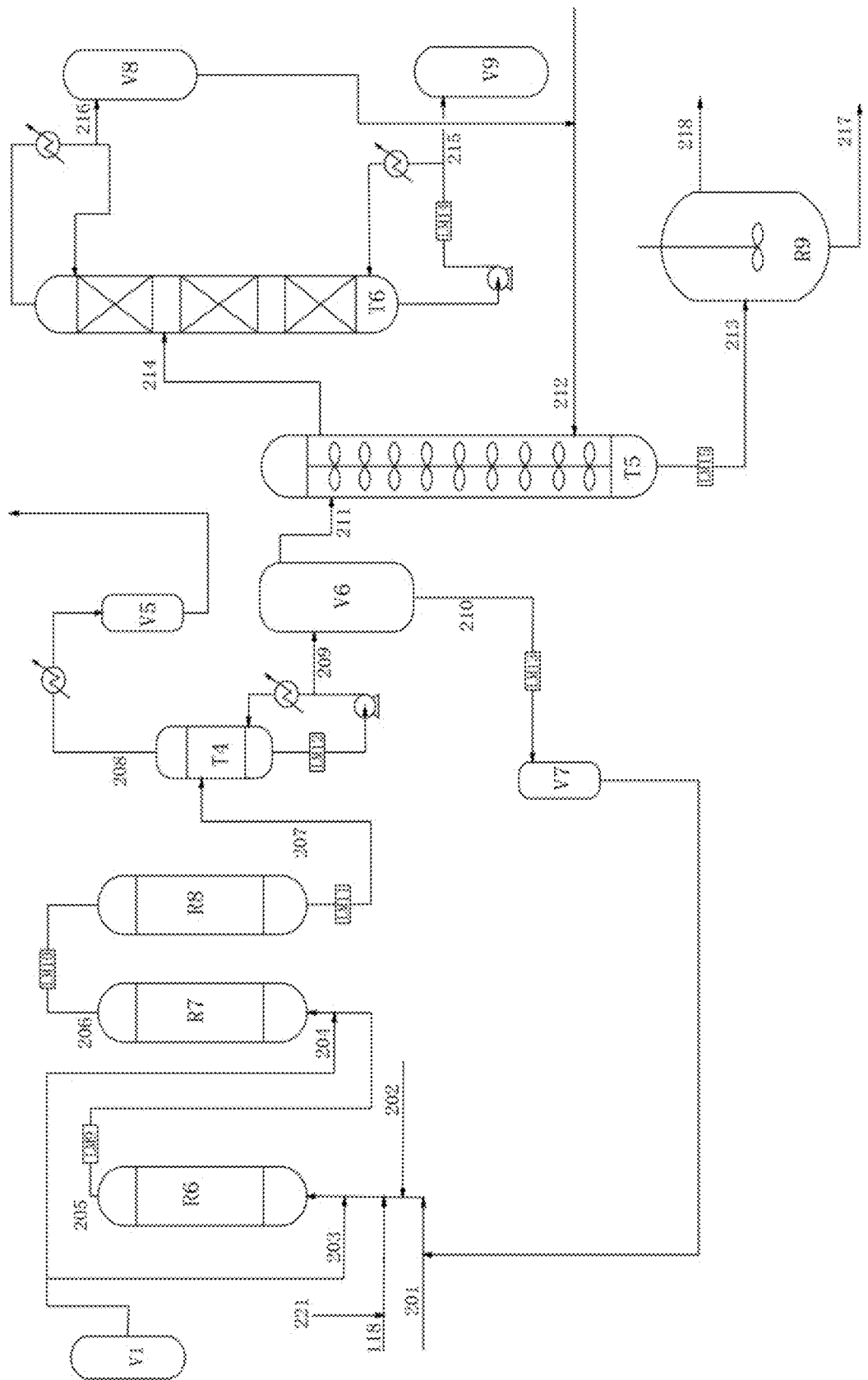
FIGS. 15 and 16 are the first part and the second part of a chart of a preferred system of the second hydrocyanation reaction+ the second post-treatment.
Figure 16:
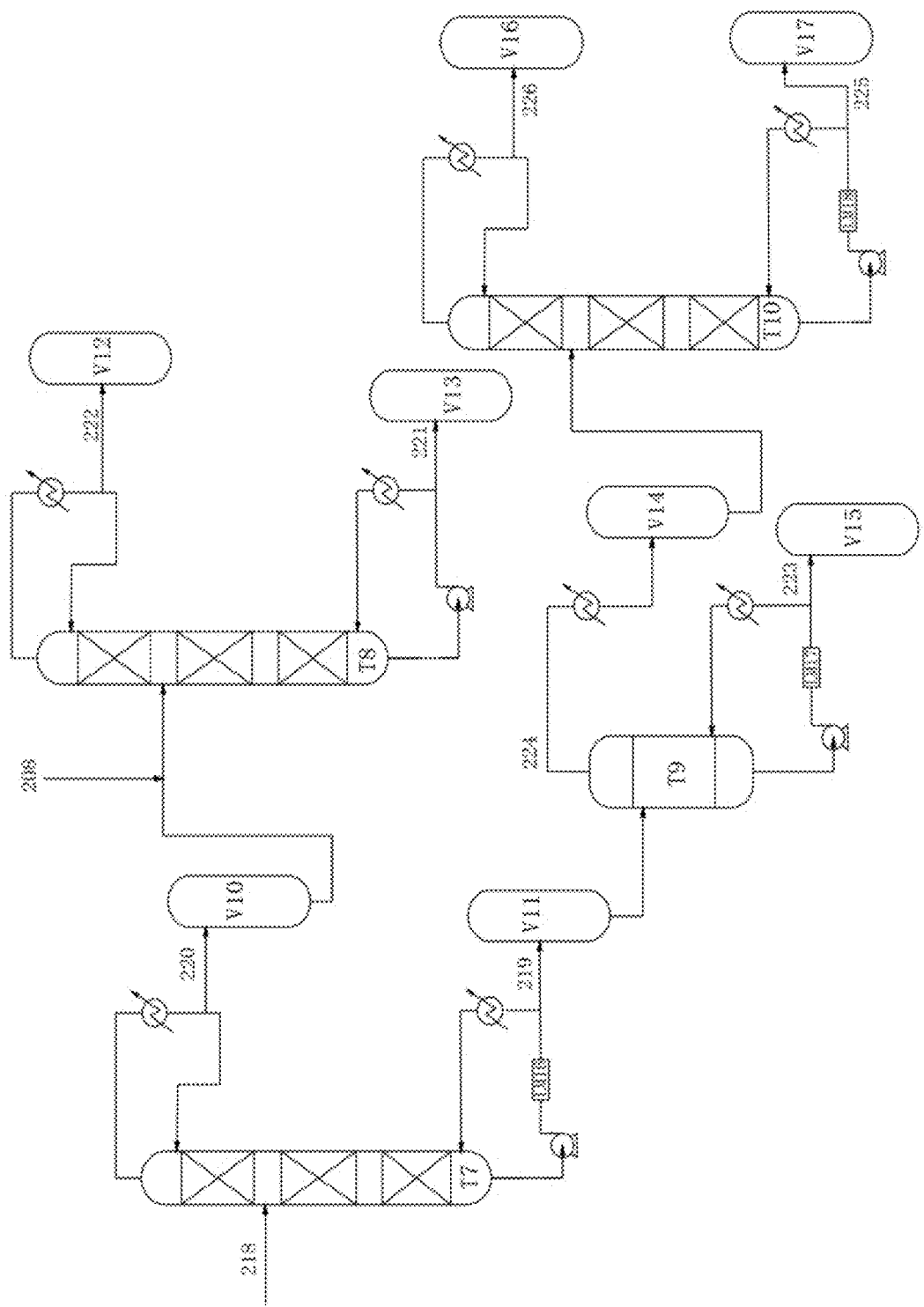

Taking a preferred production system as an example (as shown in FIGS. 14 to 16), the first reactor is a reactor with three stages of R1, R2, and R3 connected in series, and online Raman spectroscopy detectors LM1, LM2, and LM3 which are respectively connected at the connection of R1 and R2, the connection of R2 and R3, and the discharge outlet of R3; the second reactor connected with the first reactor is a tower reactor with two stages of R4 and R5 connected in series, and online Raman spectroscopy detectors LM4 and LM5 which are respectively connected at the connection of R4 and R5 and the discharge outlet of R5; a first distillation equipment T1, a second distillation equipment T2, and a third distillation equipment T3 are sequentially connected with the discharge outlet of the second reactor, and an online Raman spectroscopy detector LM6 is provided at the bottom of the column T1, an online Raman spectroscopy detector LM7 is provided at the bottom of the column T2, an online Raman spectroscopy detector LM8 is provided at the sideline discharge outlet at the bottom of the column T3: the third reactor of T3 is a tower reactor with three stages of R6, R7, and R8 connected in series, and online Raman spectroscopy detectors LM9, LM10, and LM11 which are respectively connected at the connection of R6 and R7, the connection of R7 and R8, and the discharge outlet of R8: a fourth distillation equipment T4, a static stratification tank V6, an extraction equipment T5, a fifth distillation equipment T6, a solid-liquid separation vessel R9, a sixth distillation equipment T7, a seventh distillation equipment T8, an eighth distillation equipment T9, and a ninth distillation equipment T are also connected with the discharge outlet of the third reactor, the feed inlet of T4 is connected with the discharge outlet of R8, the discharge outlet at the top of the column T4 is connected with the feed inlet of T8, the discharge outlet at the bottom of the column T4 is connected with the feed inlet of V6, the discharge outlet at the bottom of T4 is also provided with an online Raman spectroscopy detector LM12; the sideline discharge outlet at the top of the column V6 is connected with the feed inlet of T5, the discharge outlet at the bottom of the column V6 is connected with the storage tank V7, the discharge outlet of the storage tank V7 is connected with the feed inlet of R6, and an online Raman spectroscope detector LM13 is provided at the discharge outlet at the bottom of the column V6; the discharge outlet at the top of the column T5 is connected with the feed inlet of T6, the discharge outlet at the bottom of the column T5 is connected with the feed inlet of R9, an online Raman spectroscopy detector LM15 is provided at the discharge outlet at the bottom of the column T5, the discharge outlet at the top of the column T6 is connected with the feed inlet of T5, the discharge outlet at the bottom of the column T6 is connected with a storage tank V9, an online Raman spectroscopy detector LM14 is also provided at the discharge outlet at the bottom of the column T6; the sideline discharge outlet at the top of the column R9 is connected with the feed inlet of T7, and the discharge outlet at the bottom of the column R9 is also provided; the discharge outlet at the top of the column T7 is connected with the feed inlet of T8, the discharge outlet at the bottom of the column T7 is connected with the feed inlet of T9, and an online Raman spectroscopy detector LM16 is provided at the bottom of the column T7; the discharge outlet at the top of the column T9 is connected with the feed inlet of T10, the discharge outlet at the bottom of the column T9 is connected with the feed inlet of a storage tank V15, and an online Raman spectroscopy detector LM17 is provided at the bottom of the column T9; the discharge outlet at the top of the column T8 is connected with the feed inlet of a storage tank V12, the discharge outlet at the bottom of the column Tt is connected with the feed inlet of a storage tank V13, the discharge outlet at the top of the column T10 is connected with a storage tank V16, the discharge outlet at the bottom of the column T10 is connected with the feed inlet of a storage tank V17, and an online Raman spectroscopy detector LM18 is also provided at the discharge outlet at the bottom of the column T10.

Said production system is also provided with a storage tank V1 connecting feed inlets of R1, R2, and R3, a storage tank V2 connecting the discharge outlet of top of the column T2, a storage tank V3 connecting the discharge outlet at the bottom of the column T1 and the feed inlet of R1, a storage tank V4 connecting the discharge outlet at the top of the column T3 and the feed inlet of R4, a storage tank V5 connecting the discharge outlet at the top of the column T4 and the feed inlet of T8, a storage tank V7 connecting the discharge outlet at the bottom of the column V6 and the feed inlet of R6, a storage tank V8 connecting the discharge outlet at the top of the column T6 and the feed inlet of T5, a storage tank V9 connecting the discharge outlet at the bottom of the column 16, a storage tank V10 connecting the discharge outlet at the top of the column T7 and the feed inlet of T8, a storage tank V11 connecting the discharge outlet at the bottom of the column T7 and the feed inlet of 19, a storage tank V12 connecting the discharge outlet at the top of the column T8, a storage tank V13 connecting the discharge outlet at the bottom of the column T8, a storage tank V14 connecting the discharge outlet at the top of the column T9 and the feed inlet of T10, and an online Raman spectroscopy detector LM17 connecting the storage tank V15 of the discharge outlet at the bottom of the column T9.

The present disclosure further provides the following examples to illustrate specific embodiments of the present disclosure. In the embodiments of the present disclosure, the percentage or "%" represents weight percentage or "wt %" unless otherwise stated.

Raman Spectroscopy

The online Raman spectra of the accompanying FIGS. 1 to 12 are used for analysis and study, and the present disclosure adopts the following Raman spectral information to determine the content of each component:

1) The content of HCN is determined from the characteristic peak located at 2100 $cm^{-1}$.
2) The content of 3PN is determined from the characteristic peak located at 1675 $cm^{-1}$.
3) The content of 2M3BN is determined from the characteristic peaks located at 1070 $cm^{-1}$ and 1645 $cm^{-1}$.
4) The content of ADN is determined from the characteristic peak located at 1045 $cm^{-1}$.
5) The contents of MGN and ESN are determined from the characteristic peaks located at 1133 $cm^{-1}$.
6) The content of the catalyst is determined from the characteristic peaks located at 1587 $cm^{-1}$ and 1610 $cm^{-1}$.
7) The content of the phosphorus ligand hydrolyzate is determined from the characteristic peaks located at 738 $cm^{-1}$ and 850 $cm^{-1}$.

Gas Chromatography

Figure 13:
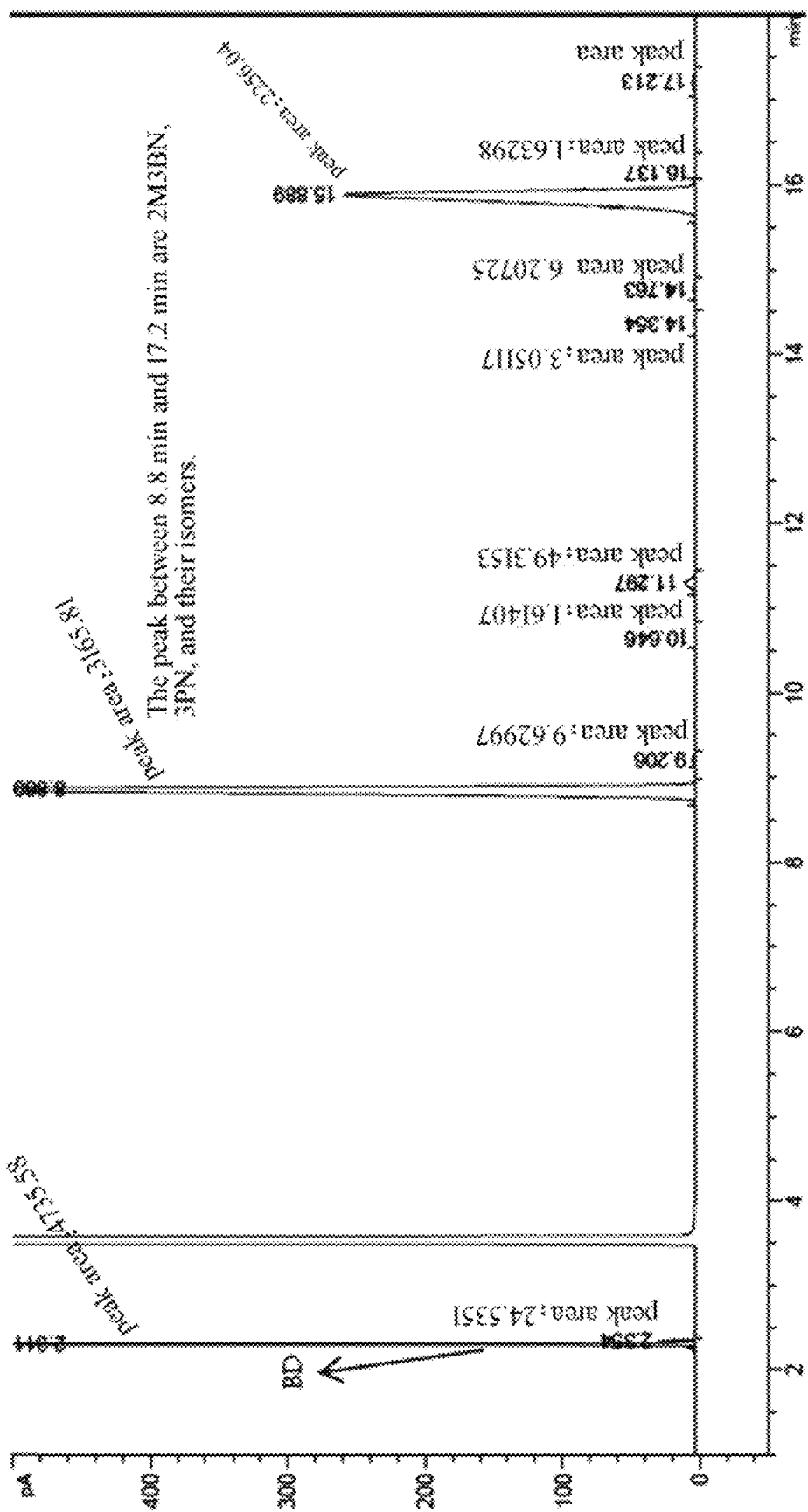
FIG. 13 is a gas chromatogram of the first hydrocyanation reaction liquid.

The content of BD is detected by online gas chromatography, and the analysis is conducted by the gas chromatography of FIG. 13.

Examples 1 to 27 were carried out in a preferred reaction system (FIGS. 14 to 16).

The ligands used in the examples had the following structural formula:

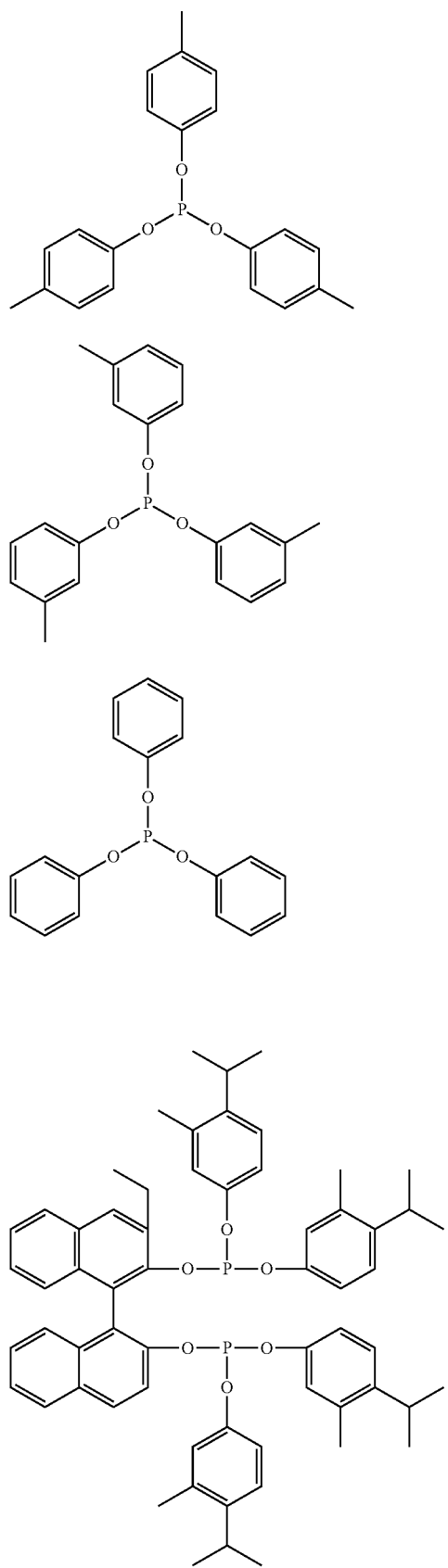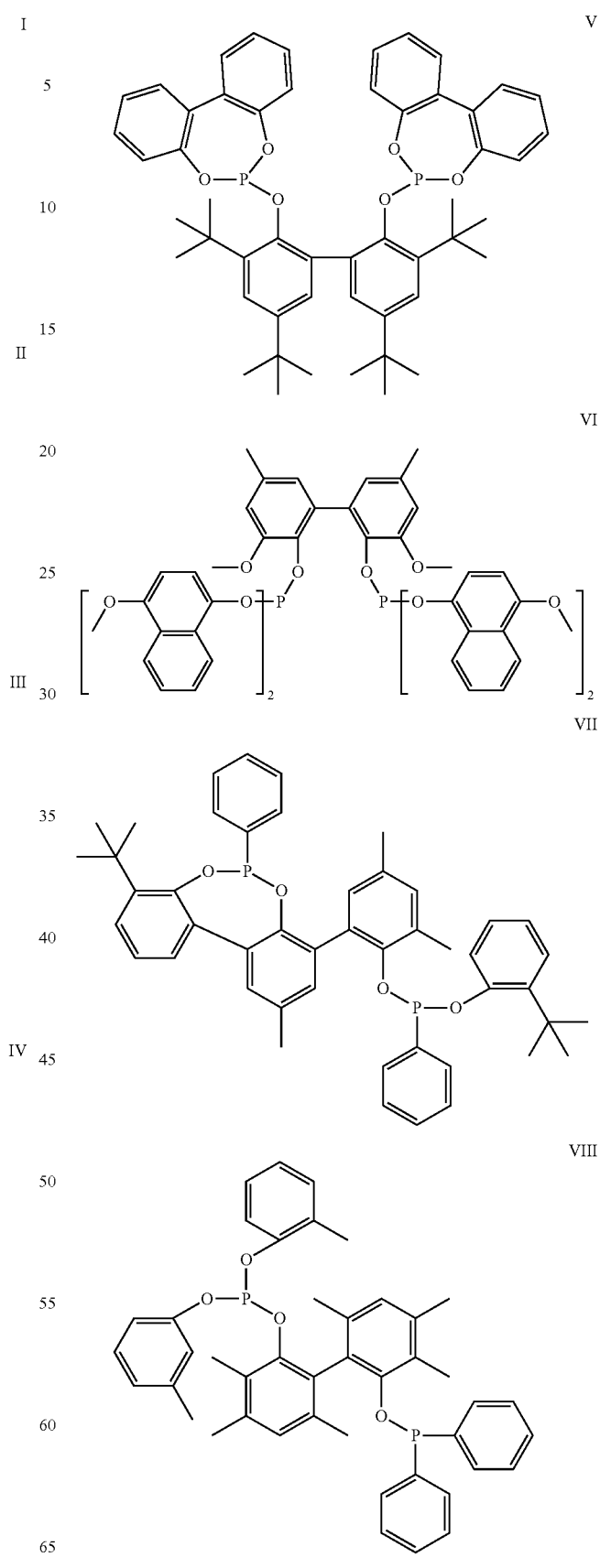

Example 1

(I) First Hydrocyanation Reaction

The stream 101 of Call (ligand, formula I, the molar ratio of total phosphorus ligand to zero-valent nickel was 12:1, the mass content of impurities was 3.6%, 3.5 Kg/hour), the stream 102 of BD (1.76 Kg/hour), and the stream 103 of HCN (0.50 Kg/hour) were continuously introduced into a stirred tank reactor R1 to perform the reaction, and the reaction temperature was 75° C., the reaction pressure was 2.0 MPa, and the reaction residence time was 0.30 hours.

The stream 106 from R1 was monitored by online Raman spectroscopy, of which the content of HCN was 230 ppm. The stream 106 was continuously introduced into a stirred tank reactor R2, and the stream 104 of HCN (0.25 Kg/hour) was continuously introduced into R2, and the reaction temperature was 75° C., the reaction pressure was 2.0 MPa, and the reaction residence time was 0.30 hours.

The stream 107 from R2 was monitored by online Raman spectroscopy of which the content of HCN was 160 ppm. The stream 107 was continuously introduced into a stirred tank reactor R3, and the stream 105 of HCN (0.10 Kg/hour) was continuously introduced into R3, and the reaction pressure was 2.3 MPa, and the reaction residence time was 0.30 hours. The stream 108 from R3 was monitored by online Raman spectroscopy, of which the content of HCN residue was less than 10 ppm. The reaction solution was heated to 108° C. by an exothermic heat of the reaction itself.

(II) Isomerization Reaction

The stream 108 from R3 was continuously introduced into a tower reactor R4 separated by five sieve plates, the reaction temperature was gradually raised from 120° C. to 140° C., the reaction pressure was 0.6 MPa, and the reaction residence time was 2.5 hours.

The stream 109 from R4 was monitored by online Raman spectroscopy, and the molar ratio of 3PN to mononitrile reached 0.82. The stream 109 was continuously introduced into a tower reactor R5 separated by five sieve plates, the reaction temperature was gradually raised from 140° C. to 160° C., the reaction pressure was 0.6 MPa, and the reaction residence time was 1.5 hours. The stream 110 from R5 was monitored by online Raman spectroscopy, and the molar ratio of 3PN to mononitrile reached 0.93.

The stream 110 from R5 was continuously introduced into a flash evaporator T1, the bottom temperature of the flash tower was controlled to be 135° C., and the flash pressure was controlled to be 0.02 MPa. The mass residue of mononitriles in the stream 113 from the bottom of the column T1 monitored by online Raman spectroscopy was 3%; and the mass content of impurities in the stream (catalyst materials) from the bottom of the column T1 was detected to be 3.7 to 4.1%. In this way, 3.8 to 4.2% of the stream 113 was discharged from the reaction system as a waste stream 112, and the remainder of the stream 113 was recycled back to R1, while the feed rate of the stream 101 was adjusted so that the amount of Call introduced into R1 per unit time was constant.

The stream 111 from the top of the column T1 was continuously introduced into a flash evaporator 12, the bottom temperature of the flash column was controlled to be 90 to 95° C., and the Bash pressure was controlled to be 0.03 MPa. The stream collected from the sideline was subjected to gas-liquid separation to obtain a stream 115 (discharging from the reaction system) containing low-boiling point impurities and a stream 114 rich in BD. The stream 114 was recycled back to 111, while the feed rate of the stream 102 was adjusted so that the introduced amount of BD per unit time was constant.

The stream 116 from the bottom of the column T2 was continuously introduced into a flash evaporator T3, the bottom temperature of the flash column was controlled to be 50 to 55° C., and the flash pressure was controlled to be 0.03 MPa. The stream collected from the top of the column was recycled back to R4 to carry out the isomerization reaction.

(III) Second Hydrocyanation Reaction

The mass residue of 2M3BN in the stream 118 from the bottom of the column T3 monitored by online Raman spectroscopy was less than or equal to 100 ppm. The stream 118 (3.4 Kg-hour), the Cat2 stream 201 (ligand: formula I, the molar ratio of total phosphorus ligand to zero-ti alert nickel was 7:1, the mass content of impurities was 0.80%, 4.2 Kg/hour), the promoter (anhydrous zinc chloride, 0.10 Kg/hour), the HCN stream 203 (0.50 Kg/hour) were introduced into a tower reactor R6 to carry out the reaction, and the reaction temperature was 50° C., the reaction pressure was 0.3 MPa, and the reaction residence time was 4.0 hours.

The stream 205 from R6 was monitored by online Raman spectroscopy, of which the content of HCN was 460 ppm; the stream 205 was continuously introduced into a tower reactor R7, and the stream 204 of HCN (0.35 Kg/hour) was continuously introduced into R7, the reaction temperature was 60° C., the reaction pressure was 0.3 MPa, and the reaction residence time was 4.0 hours. The stream 206 from R7 was monitored by online Raman spectroscopy, of which the content of HCN was 320 ppm; and after 0.5 hours reaction via a tubular reactor R8, the content of HCN in the stream 207 from R8 detected by online Raman spectroscopy was less than 10 ppm.

The stream 207 from R8 was continuously introduced into a flash evaporator 14, and the bottom temperature of the flash column was controlled to be 90 to 95° C., and the flash pressure was controlled to be 0.08 MPa. The stream 208 collected from the top of the column T4 was introduced into a storage tank V5, and then was introduced into a flash evaporator T8 for treatment.

The molar ratio of mononitriles to dinitriles in the stream 209 from the bottom of the column T4 monitored by online Raman spectroscopy was 0.04:1, and the stream 209 was introduced into a static stratification tank V6 to perform a static stratification. The mass content of impurities in the Cat2 stream 210 from the bottom of V6 detected by online Raman spectroscopy was 0.25%, and the stream 210 was recycled back to R6, while the feed rate of the stream 201 was adjusted so that the amount of Cat2 introduced to R6 per unit time was constant.

The stream 211 (5.1 Kg/hour) from the upper layer of V6 was continuously introduced through the sideline of the top the extraction column T5, and the extractant stream 212 was introduced through the sideline at the bottom of the extraction column T5 (the extractant was cyclohexane, 5.0 Kg/hour), and the extraction temperature was controlled to be 65° C., and the extraction pressure was controlled to be 0.15 MPa. The stream 214 collected from the sideline at the top of the column T5 was continuously introduced into a hash evaporator T6, and the flash temperature was controlled to be 65° C., and the flash pressure was controlled to be 0.05 MPa. The stream 216 collected from the top of the column V6 was recycled as an extractant, and the stream from the bottom of the column V6 was introduced into a storage tank V9 for backup.

The mass residue of Cat2 in the stream 213 from the bottom of the column T5 detected by online Raman spectroscopy was less than 0.2%, and the stream 213 was continuously introduced into a solid-liquid separation vessel R9. The solid spent catalyst material at the bottom of R9 was discharged from the reaction system as a waste stream 217.

The stream 218 from the top of the column R9 was continuously introduced into a distillation column T7, and the bottom temperature of the column was controlled to be 90 to 95° C., and the pressure was controlled to be 0.03 MPa. The stream 220 collected from the top of the column T7 was combined with the stream 208, and the combined stream was continuously introduced into a distillation column T8 for treatment, and the bottom temperature of the column was controlled to be 135 to 140° C., and the pressure was controlled to be 0.12 to 0.15 MPa. The stream from the bottom of the column T8 was recycled back to R6 to carry out the second hydrocyanation reaction, while the feed rate of the stream 118 was adjusted so that the amount of 3PN introduced into R6 per unit time was constant. The stream 222 collected from the top of the column T8 was discharged from the system.

The mass residue of mononitriles in the stream 219 from the bottom of the column T7 detected by online Raman spectroscopy was less than 0.2%, and the stream 219 was continuously introduced into a flash evaporator T9, and the temperature of the flash evaporation was controlled to be 180 to 190° C.; and the flash pressure was controlled to be 0.002 MPa. The mass residue of dinitriles in the stream 223 from the bottom of the column T9 monitored by online Raman spectroscopy was less than or equal to 0.5%, and the stream 223 was discharged from the reaction system.

The stream 224 collected from the top of the column T9 was continuously introduced into a distillation column T10, and the bottom temperature of the column was controlled to be 150 to 160° C., and the flash pressure was controlled to be 0.01 MPa. The stream 226 collected from the top of the column T10 was discharged from the reaction system. The mass residue of MGN in the stream 225 from the bottom of the column T10 monitored by online Raman spectroscopy was less than 100 ppm, a product of ADN was obtained, and the purity of which was greater than or equal to 99.7%, and the yield was 2.7 Kg/hour.

Examples 2 to 6

The method shown in Example 1 was run continuously under the same reaction conditions to give the following results:

| Example | Running time/hour | Yield of ADN/kg | Loss rate of Cat1/% | Loss rate of Cat2/% |
|---|---|---|---|---|
| 2 | 10 | 27.1 | 3.9 | 3.0 |
| 3 | 50 | 135.5 | 3.8 | 2.8 |
| 4 | 100 | 270.9 | 3.8 | 2.7 |
| 5 | 200 | 541.8 | 3.8 | 2.7 |
| 6 | 500 | 1357.3 | 3.7 | 2.8 |

*The above loss rates of Cat1 and Cat2 are the data of average loss rates per unit hour.

Examples 7 to 12

The first hydrocyanation reaction was carried out as described in Example 1, except that the feed rates of each material and reaction conditions were changed, and the obtained results were shown in Table 1:

TABLE 1

| Example | 101/ Kg/h | 102/ Kg/h | 103/ Kg/h | 104/ Kg/h | 105/ Kg/h | R1 Temperature/ °C. | R1 Residence time/h | R2 Temperature/ °C. | R2 Residence time/h | R3 Temperature/ °C. | R3 Residence time/h | Residual amount of HCN in stream 108/ppm | Loss rate of Cat1/% |
|---|---|---|---|---|---|---|---|---|---|---|---|---|---|
| 7 | 0.7 | 1.76 | 0.46 | 0.20 | 0.09 | 70 | 0.4 | 70 | 0.4 | 120 | 0.2 | <10 | 3.6 |
| 8 | 2.0 | 1.76 | 0.50 | 0.23 | 0.11 | 75 | 0.3 | 75 | 0.3 | 120 | 0.2 | <10 | 3.8 |
| 9 | 3.5 | 1.76 | 0.50 | 0.25 | 0.10 | 80 | 0.3 | 80 | 0.4 | 113 | 0.2 | <10 | 3.8 |
| 10 | 4.0 | 1.76 | 0.50 | 0.25 | 0.10 | 90 | 0.1 | 90 | 0.1 | 120 | 0.1 | <10 | 3.9 |
| 11 | 5.5 | 1.76 | 0.54 | 0.25 | 0.06 | 100 | 0.06 | 100 | 0.06 | 115 | 0.07 | <10 | 4.1 |
| 12 | 7.0 | 1.76 | 0.52 | 0.24 | 0.10 | 100 | 0.03 | 100 | 0.03 | 120 | 0.04 | <10 | 3.9 |

*The above 101 refers to the Cat1 feed, 102 refers to BD feed, 103 refers to the HCN feed introduced into R1, 104 refers to HCN feed introduced into R2, and 105 refers to HCN introduced into R3, the loss rate of Cat1 refers to the average loss rate per unit hour of Cat1 after continue reaction for 50 h.

Examples 13 to 18

The second hydrocyanation reaction was carried out as described in Example 1, except that the feed rates of each material and reaction conditions were changed, and the obtained results were shown in Table 2:

TABLE 2

| Example | 118/ Kg/h | 201/ Kg/h | 202/ Kg/h | 203/ Kg/h | 204/ Kg/h | R6 Temperature/ °C. | R6 Residence time/h | R7 Temperature/ °C | R7 Residence time/h | R8 Temperature/ °C. | R8 Residence time/h | Residual amount of HCN in stream 207/ppm | Loss rate of Cat2/% |
|---|---|---|---|---|---|---|---|---|---|---|---|---|---|
| 13 | 2.0 | 2.5 | 0.06 | 0.3 | 0.2 | 50 | 10 | 50 | 9 | 50 | 1.0 | <10 | 2.7 |
| 14 | 4.5 | 5.6 | 0.13 | 0.7 | 0.4 | 60 | 6.0 | 70 | 3.0 | 70 | 2.0 | <10 | 2.9 |

TABLE 2-continued

| Example | 118/ Kg/h | 201/ Kg/h | 202/ Kg/h | 203/ Kg/h | 204/ Kg/h | R6 Temperature/ °C. | R6 Residence time/h | R7 Temperature/ °C | R7 Residence time/h | R8 Temperature/ °C. | R8 Residence time/h | Residual amount of HCN in stream 207/ppm | Loss rate of Cat2/% |
|---|---|---|---|---|---|---|---|---|---|---|---|---|---|
| 15 | 6.8 | 8.4 | 0.3 | 1.0 | 0.7 | 70 | 3.0 | 70 | 2.0 | 70 | 1.0 | <10 | 2.5 |
| 16 | 20.4 | 25.2 | 0.6 | 4.0 | 2.4 | 80 | 1.0 | 80 | 0.5 | 80 | 0.5 | <10 | 2.5 |
| 17 | 3.2 | 5.6 | 0.1 | 0.5 | 0.35 | 55 | 8.0 | 55 | 6.0 | 55 | 2.0 | <10 | 2.8 |
| 18 | 6.8 | 1.2 | 0.02 | 1.0 | 0.7 | 65 | 5.0 | 65 | 2.0 | 65 | 2.0 | <10 | 2.8 |

*The above 118 refers to the stream feed rich in 3PN, 201 refers to the Cat2 feed, 202 refers to the promoter feed, 203 refers to the HCN feed introduced into R6, 204 refers to the HCN feed introduced into R7, the loss rate of Cat2 refers to the average loss rate per unit hour of Cat2 after continue reaction for 50 h.

Examples 19 to 27

The operation was continued for 50 h under the same conditions as in Example 1 except that the types of Cat1, Cat2, and Lewis acid were changed, and the obtained results were shown in Table 3.

TABLE 3

| Example | Cat1 Ligand | Cat1 Ratio | Cat2 Ligand | Cat2 Ratio | Lewis acid | Yield of ADN/kg | Loss rate of Cat1/% | Loss rate of Cat2/% |
|---|---|---|---|---|---|---|---|---|
| 19 | Formula I | 30:1 | Formula I | 15:1 | ZnBr$_2$ | 130.2 | 4.0 | 2.9 |
| 20 | Formula II | 20:1 | Formula I | 10:1 | ZaCl$_2$ | 135.7 | 3.8 | 2.8 |
| 21 | Formula I | 12:1 | Formula III | 15:1 | BPh$_3$ | 134.6 | 3.8 | 2.5 |
| 22 | Formula I | 12:1 | Formula IV | 3:1 | ZnCl$_2$ | 136.3 | 3.9 | 3.3 |
| 23 | Formula I | 12:1 | Formula V | 2:1 | Ph$_3$SnOTf | 135.2 | 3.8 | 2.6 |
| 23 | Formula I | 12:1 | Formula VI | 3:1 | ZnCl$_2$ | 135.9 | 3.9 | 2.5 |
| 24 | Formula I | 12:1 | Formula VII | 3:1 | ZnCl$_2$ | 135.6 | 3.9 | 2.8 |
| 25 | Formula VII | 3:1 | Formula VII | 3:1 | ZnCl$_2$ | 135.8 | 3.0 | 2.7 |
| 26 | Formula I | 12:1 | Formula VIII | 3:1 | ZnCl$_2$ | 135.1 | 3.8 | 3.2 |
| 27 | Formula VIII | 3:1 | Formula VIII | 3:1 | ZaCl$_2$ | 134.8 | 4.1 | 3.1 |

*The above loss rates of Cat1 and Cat2 are the data of average loss rates per unit hour; the ratio in the table refers to the value of the molar ratio of the total phosphorus ligands to the zero-valent Ni in the catalyst.

What is claimed is:

1. A method for preparing adiponitrile, the method comprising:
   step 1: subjecting hydrocyanic acid and butadiene to a first hydrocyanation reaction in the presence of a first catalyst to form a first stream comprising 3-pentenenitrile (3PN), 2-methyl-3-butenenitrile (2M3BN), the first catalyst, and butadiene, detecting the concentration of the hydrocyanic acid in the system, and enabling a residual amount of the hydrocyanic acid in the final first stream to be less than 10 ppm and a molar ratio of a total amount of the hydrocyanic acid to the amount of butadiene in the first hydrocyanation reaction to be 0.75 to 1.0 by regulating a ratio of raw materials, a reaction temperature, a reaction residence time, or a combination of the above modes;
   step 2: subjecting the first stream obtained in step 1 to an isomerization reaction to obtain a second stream comprising a mononitrile containing 2-pentenenitrile (2PN), 3-pentenenitrile (3PN), and 4-pentenenitrile (4PN), an unreacted 2-methyl-3-butenenitrile (2M3BN), the first catalyst, and butadiene, detecting the amounts of 3-pentenenitrile (3PN) and 2-methyl-3-butenenitrile (2M3BN) in the reaction system, and enabling the ratio of 3-pentenenitrile (3PN) in the second stream to the mononitrile containing 2-pentenenitrile (2PN), 3-pentenenitrile (3PN), and 4-pentenenitrile (4PN) to be 0.8 or more by regulating the amount of the first catalyst, the reaction temperature, the reaction residence time, or the combination of the above modes; then, obtaining a stream containing 3-pentenenitrile (3PN) by a post-treatment step;
   step 3: subjecting the hydrocyanic acid, the stream containing 3-pentenenitrile (3PN) obtained in step 2, a second catalyst and a promoter to a second hydrocyanation reaction to obtain a third stream containing the 3-pentenenitrile (3PN), the second catalyst, the promoter, and a dinitrile component containing adiponitrile (ADN), 2-methylglutaronitrile (MGN), and 2-ethylsuccinonitrile (ESN), detecting the amounts of the second catalyst, the hydrocyanic acid residue and/or 3-pentenenitrile (3PN) residue in the system, and enabling a conversion rate of 3-pentenenitrile (3PN) to be 60% or more and the molar ratio of the total amount of the hydrocyanic acid to 3-pentenenitrile (3PN) in the second hydrocyanation reaction to be 0.60 to 1.0 by regulating the ratio of raw materials, the reaction temperature, the reaction residence time, or the combination of the above modes; and, obtaining an adiponitrile product by the post-treatment step;
   wherein an online Raman spectroscopy detection is adopted for the above detection;

the first catalyst and the second catalyst are each independently selected from zero-valent nickel complexes containing phosphorus ligands and/or free phosphorus ligands; and the promoter is a Lewis acid.

2. The method according to claim 1, wherein the first hydrocyanation reaction is carried out in a first reactor, and the first reactor is selected from a circulating reactor, a multistage series circulating reactor, a stirred tank reactor, a multistage series agitation reactor, a tubular reactor with premixing, a multistage series tubular reactor, a combination of the circulating reactor and the tubular reactor, a combination of the multistage series circulating reactor and the tubular reactor, and a combination of the agitation reactor and the tubular reactor, or a combination of the multistage series agitation reactor and the tubular reactor, and the multistage series reactor is 2 to 10 stages connected in series, and the residence time of each stage of the reactor in the first hydrocyanation reaction is 0.01 to 5.0 hours.

3. The method according to claim 2, wherein when the step 1 is carried out in the multistage series reactor, the concentration of hydrocyanic acid in the stream of each stage of the reactor is detected, wherein the stream of the last stage is the first stream.

4. The method according to claim 1, wherein a temperature of the first hydrocyanation reaction in the step 1 is 60 to 140° C., and a reaction pressure is 0.5 to 5.0 MPa; the feeding molar ratio of the zero-valent nickel to butadiene is 0.001 to 0.10:1; and the molar ratio of the total amount of phosphorus ligands and free phosphorus ligands to the zero-valent nickel in the first catalyst is 5 to 50:1.

5. The method according to claim 1, wherein the post-treatment step in step 2 is distillation, and the stream containing 3-pentenenitrile (3PN) is obtained by distillation, wherein the residual amounts of the other components comprising butadiene and 2-methyl-3-butenenitrile (2M3BN) other than 3-pentenenitrile (3PN) is detected, and at least one of temperature, pressure, residence time, and reflux ratio of the distillation is controlled based on the detection result, so that a content of 3PN is ≥98% and the content of 2M3BN is ≤0.5% in the stream containing 3-pentenenitrile (3PN).

6. The method according to claim 5, wherein the distillation is a three-stage distillation, and the stream containing butadiene, 3-pentenenitrile (3PN), and 2-methyl-3-butenenitrile (2M3BN) is separated from the stream containing the first catalyst by the first stage distillation; the stream containing butadiene, 3-pentenenitrile (3PN), and 2-methyl-3-butenenitrile (2M3BN) is subjected to distillation by the second stage distillation, thereby separating the stream containing butadiene from the stream containing 3-pentenenitrile (3PN) and 2-methyl-3-butenenitrile (2M3BN); the stream containing 3-pentenenitrile (3PN) and 2-methyl-3-butenenitrile (2M3BN) is subjected to distillation by the third distillation, thereby separating the stream containing 3-pentenenitrile (3PN) from the stream containing 2-methyl-3-butenenitrile (2M3BN);

and the detection is online Raman spectroscopy detection.

7. The method according to claim 1, wherein the isomerization reaction is carried out in the second reactor, and the second reactor is selected from a tower reactor with internal separation, a multistage series tower reactor with internal separation, a stirred tank reactor, a multistage stirred tank reactor, a tubular reactor, and a multistage series tubular reactor; and the multistage series reactor is 2 to 20 stages connected in series; and the residence time of each stage of the reactor in the isomerization reaction is 0.01 to 50 hours.

8. The method according to claim 1, wherein an initial molar ratio of the zero-valent nickel to 3-pentenenitrile (3PN) and 2-methyl-3-butenenitrile (2M3BN) in the isomerization reaction is 0.001 to 0.10:1, and the reaction temperature of the isomerization reaction is 100 to 175° C., and the reaction pressure is 0.5 to 5.0 MPa.

9. The method according to claim 1, wherein in the second hydrocyanation reaction, the feeding molar ratio of the zero-valent nickel to 3-pentenenitrile (3PN) is 0.001 to 0.05:1, and the molar ratio of the total amount of phosphorus ligands and free phosphorus ligands to the zero-valent nickel in the second catalyst is 4 to 20:1.

10. The method according to claim 1, wherein the Lewis acid is selected from the salts of elements from Groups Ib, IIb, IIIa, IIIb, IVa, IVb, Va, Vb, VIb, VIIb and VIII of the Periodic Table of the Elements, and the salt is selected from a halide, a sulfate, a sulfonate, a haloalkylsulfonate, a perhaloalkylsulfonate, a haloalkylacetate, a perhaloalkylacetate, a carboxylate, and a phosphate; preferably, the Lewis acid is selected from zinc chloride, zinc bromide, zinc iodide, manganese chloride, manganese bromide, cadmium chloride, cadmium bromide, stannous chloride, stannous bromide, stannous sulfate, stannous tartrate, indium trifluoromethanesulfonate, indium trifluoroacetate, zinc trifluoroacetate, chlorides or bromides of rare earth elements such as lanthanum, cerium, praseodymium, neodymium, samarium, europium, gadolinium, terbium, dysprosium, hafnium, erbium, thallium, ytterbium and lutetium, cobalt chloride, ferrous chloride, yttrium chloride and mixtures thereof; more preferably, the Lewis acid is zinc chloride or ferric chloride; and a feeding molar ratio of the Lewis acid to zero-valent nickel is 0.05 to 2.5:1.

11. The method according to claim 1, wherein the second hydrocyanation reaction is carried out in the third reactor, and the third reactor is selected from a circulating reactor, a multistage series circulating reactor, a stirred tank reactor, a multistage series agitation reactor, a tubular reactor with premixing, a multistage series tubular reactor, a combination of the circulating reactor and the tubular reactor, a combination of the multistage series circulating reactor and the tubular reactor, a combination of the agitation reactor and the tubular reactor, a combination of the multistage series agitation reactor and the tubular reactor; and the multistage series reactor is 2 to 10 stages connected in series; and in the second hydrocyanation reaction, the residence time of each stage of the reactor is 0.5 to 50 hours.

12. The method according to claim 1, wherein the post-treatment step in the step 3 comprises a distillation step, an extraction step and a five-stage distillation step which are sequentially performed, thereby obtaining a product of adiponitrile (ADN).

13. The method according to claim 12, wherein the amounts of mononitrile, dinitrile, the first catalyst, the second catalyst and/or the promoter contained in each stream is optionally detected in the distillation step, the extraction step and the five-stage distillation step which are sequentially performed, and the operation condition is regulated based on the detection result, so that the content of adiponitrile (ADN) is ≥99.7% and the residual of 2-methylglutaronitrile (MGN) is ≤100 ppm in the product; and the detection is online Raman spectroscopy detection.

14. A device for preparing adiponitrile, comprising: a first reactor used for conducting the first hydrocyanation reaction, a second reactor used for conducting the isomerization reaction, a first post-treatment equipment, third reactor used for conducting the second hydrocyanation reaction, and a second post-treatment equipment which are connected in sequence, and the first reactor, the second reactor, the first post-treatment equipment, the third reactor, and the second post-treatment equipment are all provided with at least one online Raman spectroscopy detection device, and the first reactor, the second reactor and the third reactor are respectively provided with a feed inlet and a discharge outlet.

15. The device according to claim 14, wherein the first reactor is selected from a circulating reactor, a multistage series circulating reactor, a stirred tank reactor, a multistage series agitation reactor, a tubular reactor with premixing, a multistage series tubular reactor, a combination of the circulating reactor and the tubular reactor, a combination of the multistage series circulating reactor and the tubular reactor, a combination of the agitation reactor and the tubular reactor, or a combination of the multistage series agitation reactor and the tubular reactor; and the multistage series reactor is 2 to 10 stages connected in series; when the first reactor is operated in a single tank, the online Raman spectroscopy detection device is provided at the middle-lower end of the reactor and/or a discharge port below the reactor; and when the first reactor is connected in multi-stage series, the online Raman spectroscopy detection device is provided in each reactor and/or at the connection of each reactor and/or at the reaction liquid discharge outlet.

16. The device according to claim 14, wherein the second reactor is selected from a tower reactor with internal separation, a multistage series tower reactor with internal separation, a stirred tank reactor, a multistage stirred tank reactor, a tubular reactor, or a multistage series tubular reactor; and the multistage series reactor is 2 to 20 stages connected in series; when the second reactor is operated in a single tank, the online Raman spectroscopy detection device is provided at the middle-lower end of the reactor and/or a discharge port below the reactor; when the second reactor is connected in multi-stage series, the online Raman spectroscopy detection device is provided in each reactor and/or at the connection of each reactor and/or at the reaction liquid discharge outlet; and the feed inlet of the second reactor is connected with the discharge outlet of the first reactor.

17. The device according to claim 16, wherein the first post-treatment equipment comprises a first distillation equipment, a second distillation equipment, and a third distillation equipment, and the first distillation equipment, the second distillation equipment and the third distillation equipment are respectively provided with a feed inlet, a discharge outlet at the top of the column and a discharge outlet at the bottom of the column;
in the first distillation equipment, the feed inlet is connected with the discharge outlet of the second reactor, the discharge outlet at the top of the column is connected with the feed inlet of the second distillation equipment, the discharge outlet at the bottom of the column is connected with the feed inlet of the first reactor, and the discharge outlet at the bottom of the column is also provided with a drainage port;
in the second distillation equipment, the feed inlet is connected with the discharge outlet at the top of the column of the first distillation equipment, the discharge outlet at the top of the column is connected with the feed inlet of the first reactor, and the discharge outlet at the bottom of the column is connected with the third distillation equipment;
and in the third distillation equipment, the feed inlet is connected with the second distillation equipment, the discharge outlet at the top of the column is connected with the feed inlet of the second reactor, and the discharge outlet at the bottom of the column is connected with the feed inlet of the third reactor.

18. The device according to claim 14, wherein the third reactor is selected from a circulating reactor, a multistage series circulating reactor, a stirred tank reactor, a multistage series agitation reactor, a tubular reactor with premixing, a multistage series tubular reactor, a combination of circulating reactor and the tubular reactor, a combination of multistage series circulating reactor and the tubular reactor, a combination of agitation reactor and the tubular reactor, a combination of multistage series agitation reactor and the tubular reactor; and the multistage series reactor is 2 to 10 stages connected in series; when the third reactor is operated in a single tank, the online Raman spectroscopy detection device is provided at the middle-lower end of the reactor and/or a discharge port below the reactor; when the third reactor is connected in multi-stage series, the online Raman spectroscopy detection device is provided in each reactor and/or at the connection of each reactor and/or at the reaction liquid discharge outlet; and the feed inlet of the third reactor is connected with the discharge outlet at the bottom of the column of the third distillation equipment.

19. The device according to claim 14, wherein the second post-treatment equipment comprises a fourth distillation equipment, a extraction equipment, a fifth distillation equipment, a sixth distillation equipment, a seventh distillation equipment, an eighth distillation equipment, and a ninth distillation equipment; and the fourth distillation equipment, the extraction equipment, the fifth distillation equipment, the sixth distillation equipment, the seventh distillation equipment, the eighth distillation equipment, and the ninth distillation equipment are respectively provided with a feed inlet, a discharge outlet at the top of the column, and a discharge outlet at the bottom of the column;
in the fourth distillation equipment, the feed inlet is connected with the discharge outlet of the third reactor, the discharge outlet at the top of the column is connected with the feed inlet of the third reactor and/or the feed inlet of the seventh distillation equipment, and the discharge outlet at the bottom of the column is connected with the feed inlet of the extraction equipment;
in the extraction equipment, the feed inlet is connected with the discharge outlet at the bottom of the column of the fourth distillation equipment, the discharge outlet at the top of the column is connected with the feed inlet of the fifth distillation equipment, and the discharge outlet at the bottom of the column is connected with the feed inlet of the sixth distillation equipment;
in the fifth distillation equipment, the feed inlet is connected with the discharge outlet at the top of the column of the extraction equipment, the discharge outlet at the top of the column is connected with the feed inlet of the extraction equipment, the discharge outlet at the bottom of the column is connected with the feed inlet of the third reactor and/or the feed inlet of the seventh distillation equipment;
in the sixth distillation equipment, the feed inlet is connected with the discharge outlet at the bottom of the column of the extraction equipment, the discharge outlet at the top of the column is connected with the feed inlet of the third reactor, and the discharge outlet at the bottom of the column is connected with the feed inlet of the eighth distillation equipment;
in the seventh distillation equipment, the feed inlet is connected with the discharge outlet at the top of the column of the fourth distillation equipment and/or the discharge outlet at the top of the sixth column, the discharge outlet at the top of the column is connected with the feed inlet of the second reactor, and the discharge outlet at the bottom of the column is connected with the feed inlet of the third reactor;

in the eighth distillation equipment, the feed inlet is connected with the discharge outlet of the sixth distillation equipment, the discharge outlet at the top of the column is connected with the feed inlet of the ninth distillation equipment, the discharge outlet at the bottom of the column is connected with the third reactor, and the discharge outlet at the bottom of the column is also provided with a drainage port;

and the feed inlet of the ninth distillation equipment is connected with the discharge outlet at the top of the column of the eighth distillation equipment.

* * * * *